US009768906B2

(12) United States Patent
Ojima et al.

(10) Patent No.: US 9,768,906 B2
(45) Date of Patent: Sep. 19, 2017

(54) OPTICAL TRANSMISSION APPARATUS AND WAVELENGTH CONTROL METHOD

(71) Applicant: FUJITSU LIMITED, Kawasaki-shi, Kanagawa (JP)

(72) Inventors: Hisayuki Ojima, Kawasaki (JP); Taku Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/001,614

(22) Filed: Jan. 20, 2016

(65) Prior Publication Data

US 2016/0261362 A1 Sep. 8, 2016

(30) Foreign Application Priority Data

Mar. 3, 2015 (JP) ................. 2015-040999

(51) Int. Cl.
*H04J 14/02* (2006.01)
*H04B 10/572* (2013.01)
*H04Q 11/00* (2006.01)

(52) U.S. Cl.
CPC ........ *H04J 14/0256* (2013.01); *H04B 10/572* (2013.01); *H04J 14/0272* (2013.01); *H04Q 11/0005* (2013.01); *H04J 14/0212* (2013.01); *H04Q 2011/0016* (2013.01)

(58) Field of Classification Search
CPC ........... H04Q 11/0005; H04Q 11/0062; H04Q 11/0001; H04Q 2011/0016; H04J 14/0212; H04J 14/0227; H04J 14/0272; H04J 14/0256; H04B 10/572
See application file for complete search history.

(56) References Cited

U.S. PATENT DOCUMENTS

| 5,886,802 | A | * | 3/1999 | Majima | ............... | H04J 14/0224 |
| | | | | | | 398/196 |
| 2010/0239260 | A1 | * | 9/2010 | Oikawa | ............ | H04B 10/07953 |
| | | | | | | 398/81 |
| 2012/0013905 | A1 | * | 1/2012 | Nozawa | ..................... | G01J 3/26 |
| | | | | | | 356/326 |
| 2014/0010535 | A1 | | 1/2014 | Oi et al. | | |

FOREIGN PATENT DOCUMENTS

| JP | 2010-226169 | 10/2010 |
| JP | 2012-23607 | 2/2012 |
| JP | 2014-14017 | 1/2014 |

* cited by examiner

*Primary Examiner* — Ted Wang

(74) *Attorney, Agent, or Firm* — Staas & Halsey LLP

(57) ABSTRACT

An optical transmission apparatus includes: a plurality of optical transmitters configured to transmit optical signals having variable wavelengths, respectively; a multiplexer configured to wavelength-multiplex the optical signals transmitted from the plurality of optical transmitters in a transmission band of an optical device through which the optical signals is transmitted; and a controller configured to control, in response to nonexistence of an optical signal having a second wavelength adjacent to a first wavelength closest to an outer edge of the transmission band in the optical signals, an optical transmitter corresponding to the first wavelength so as to shift the first wavelength in a direction toward the second wavelength.

8 Claims, 20 Drawing Sheets

OPTICAL TRANSMISSION APPARATUS AND WAVELENGTH CONTROL METHOD

CROSS-REFERENCE TO RELATED APPLICATION

This application is based upon and claims the benefit of priority from the prior Japanese Patent Application No. 2015-040999, filed on Mar. 3, 2015, the entire contents of which are incorporated herein by reference.

FIELD

The embodiments discussed herein are related to an optical transmission apparatus, and a wavelength control method.

BACKGROUND

As one of optical communication techniques, there is a technique for wavelength multiplexing of light having plural wavelengths (may be referred to as "channels") with high density and transmitting the wavelength-multiplexed light.

Such an optical transmission technique may be referred to as "super-channel transmission." In the super-channel transmission, by narrowing the spectrum of the signal light to be transmitted by using digital signal processing, a channel spacing may be more narrowed than that in conventional wavelength division multiplexing (WDM) transmission. Therefore, it is possible to improve the frequency utilization efficiency of an optical transmission band available in an optical transmission system.

Related techniques are disclosed in, for example, Japanese Laid-Open Patent Publication No. 2010-226169, Japanese Laid-Open Patent Publication No. 2012-023607, and Japanese Laid-Open Patent Publication No. 2014-014017.

SUMMARY

According to an aspect of the invention, an optical transmission apparatus includes: a plurality of optical transmitters configured to transmit optical signals having variable wavelengths, respectively; a multiplexer configured to wavelength-multiplex the optical signals transmitted from the plurality of optical transmitters in a transmission band of an optical device through which the optical signals is transmitted; and a controller configured to control, in response to nonexistence of an optical signal having a second wavelength adjacent to a first wavelength closest to an outer edge of the transmission band in the optical signals, an optical transmitter corresponding to the first wavelength so as to shift the first wavelength in a direction toward the second wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
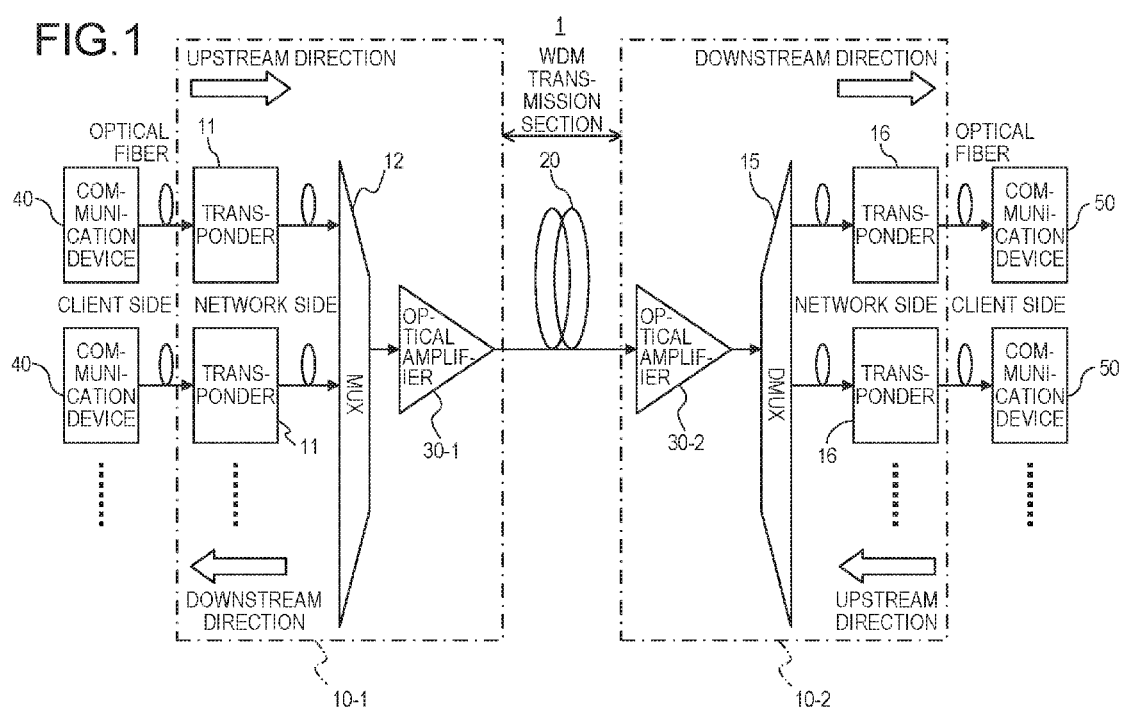
FIG. 1 is a block diagram illustrating an exemplary configuration of a WDM optical network as an example of an optical transmission system.

In the case of narrowing the channel spacing in order to improve a frequency utilization efficiency as in the super channel transmission, if the wavelength control of each channel is not carried out appropriately, the transmission quality of any channel may be easily deteriorated as compared with the conventional WDM transmission. In the worst case, a signal interruption of the channel may occur.

For example, according to the characteristics of the transmission band of an optical device (e.g., a wavelength selective switch) through which a super-channel signal is transmitted, the spectrum of a channel which is closest to an outer edge of the transmission band may be cut by the band restriction of the transmission band.

Hereinafter, embodiments of a technology for controlling the wavelength of light such that light of multiple wavelengths is wavelength-multiplexed will be described with reference to the accompanying drawings. However, the embodiments to be described below are merely illustrative and are not intended to exclude various modifications or applications of techniques not specified below. Further, various exemplary embodiments to be described below may be carried out appropriately in combination. In the drawings used in the following embodiments, portions denoted by the same reference numerals, unless otherwise specified, represent the same or like portions.

In recent years, as the traffic of communication devices is increased, a demand for even larger capacity and higher speed of network is increasing. For example, in an optical transmission apparatus as an example of an element of the optical network, a digital coherent signal processing technique using a dual polarization-quadrature phase shift keying (DP-QPSK) modulation scheme may be employed.

By employing the digital coherent signal processing technique, it is possible to increase the transmission speed per wavelength (which may be referred to as "channel") to, for example, 100 gigabits/sec (Gbps) or a speed higher than 100 Gbps.

Further, by using wavelength division multiplexing (WDM) technology in combination, an increase of the maximum transmission capacity of the optical network may be accomplished. For example, an optical signal of 100 Gbps per channel can be wavelength-multiplexed for up to 88 channels. That is, it is possible to enlarge the maximum transmission capacity per optical fiber to 8.8 terabits/sec (Tbps).

FIG. 1 illustrates an exemplary configuration of a WDM optical network as an example of an optical transmission system. A WDM optical network 1 illustrated in FIG. 1 includes, for example, an optical transmission apparatus 10-1 and an optical transmission apparatus 10-2 which is connected to the optical transmission apparatus 10-1 via an optical transmission line 20 to enable an optical communication with the optical transmission apparatus 10-1.

When the optical transmission apparatuses 10-1 and 10-2 are not to be distinguished from each other, the optical transmission apparatuses 10-1 or 10-2 may be simply referred to as an "optical transmission apparatus 10." The optical transmission apparatus 10 is an example of an element (network element: NE) of the WDM optical network 1. An optical transmitting station, an optical receiving station, an optical relay station, an optical add-drop station such as a reconfigurable optical add/drop multiplexer (ROADM) or the like may be applicable to the NE 10. "Station" may be referred to as "node."

By way of example, in FIG. 1, the NE 10-1 corresponds to an optical transmitting station (optical transmitting node), and the NE 10-2 corresponds to an optical receiving station (e.g., an optical receiving node).

The optical transmission line 20 is, for example, an optical fiber transmission line. In the optical transmission apparatus 10 or the optical transmission line 20, an optical amplifier may be provided appropriately depending on a transmission distance of a WDM optical signal. A node with the optical amplifier provided in the middle of the optical transmission line 20 may be regarded as corresponding to an optical relay node. Depending on the transmission distance of the WDM optical signal, the optical amplifier may be unnecessary.

The optical transmission apparatus 10-1 may include, as illustrated in FIG. 1, a plurality of transponders 11, a wavelength multiplexer (MUX) 12, and an optical amplifier 30-1.

The transponders 11 may be connected to a communication device 40 such as a router via an optical fiber. Here, the communication device 40 is, for example, a communication device 40 on a client side (may be referred to as a "tributary side"). A signal transmitted from the communication device 40 is converted into an optical signal of a single wavelength (channel) after being received by the corresponding transponder 11, and is input to the multiplexer 12.

Meanwhile, an optical fiber may be used for the connection between each of the transponders 11 and the multiplexer 12. In other words, each of the transponders 11 and the multiplexer 12 may be optically connected to be enabled for an optical communication.

The multiplexer 12 may be a multiplexing coupler such as a WDM coupler, and generates a WDM optical signal by wavelength-multiplexing the optical signal received from each of the transponders 11 to transmit the WDM optical signal to the optical transmission line 20. In the transmission, the WDM optical signal may be amplified to a predetermined transmission optical power by the optical amplifier 30-1 provided at a rear stage (post-stage) of the multiplexer 12.

The WDM optical signal transmitted to the optical transmission line 20 is received by the optical transmission apparatus 10-2. The optical transmission apparatus 10-2 may include, for example, an optical amplifier 30-2, a wavelength demultiplexer (DMUX) 15 and a plurality of transponders 16. When the optical amplifiers 30-1 and 30-2 may not be distinguished from each other, they may be simply referred to as the "optical amplifier 30."

The demultiplexer 15 divides the WDM optical signal, which has been input from the optical transmission line 20 and amplified by the optical amplifier 30-2, for each wavelength and inputs the divided signal to any one of the transponders 16. In addition, in case of a coherent reception in the transponders 16, the demultiplexer 15 may be, alternatively, an optical splitter for splitting the WDM optical signal. The optical splitter may be a branched coupler.

Each of the transponders 16 photoelectrically converts an optical signal input from the demultiplexer 15 into an electrical signal, and transmits the electrical signal to a communication device 50 such as a router. The communication device 50 is, for example, a communication device on the client side.

Although a configuration focusing on the unidirectional communication from the optical transmission apparatus 10-1 toward the optical transmission apparatus 10-2 has been illustrated in FIG. 1, the same configuration may be employed for the communication in a reverse direction. In other words, it is beneficial that bidirectional communication may be carried out between the optical transmission apparatus 10-1 and the optical transmission apparatus 10-2 (e.g., between the communication device 40 and the communication device 50).

The bidirectional communication may be carried out via the optical transmission line 20 provided separately for each of both directions between the optical transmission apparatus 10-1 and the optical transmission apparatus 10-2. For example, a reverse communication from the optical transmission apparatus 10-2 to the optical transmission apparatus 10-1 may be regarded as being implemented by a configuration in which, in FIG. 1, the optical transmission apparatus 10-1 and the optical transmission apparatus 10-2 are replaced with each other.

In the bidirectional communication, a direction in which the optical transmission apparatus 10-1 (or 10-2) transmits a WDM optical signal to the optical transmission line 20 is called an "upstream direction," and a reverse direction, i.e., a direction in which the optical transmission apparatus 10-1 (or 10-2) receives a WDM optical signal from the optical transmission line 20, is called a "downstream direction."

Therefore, each of the optical transmission apparatuses 10-1 and 10-2 may include a transmitting system corresponding to the upstream direction and a receiving system corresponding to the downstream direction. For example, in FIG. 1, the transponders 11 and the multiplexer 12 correspond to the transmitting system of the optical transmission apparatus 10-1, and the demultiplexer 15 and the transponders 16 correspond to the receiving system of the optical transmission apparatus 10-2.

In other words, it may be considered that the optical transmission apparatus 10-1 includes, although not illustrated in FIG. 1, as a receiving system, the demultiplexer 15 and the transponders 16, similarly to the receiving system of the optical transmission apparatus 10-2. Further, it may be considered that the optical transmission apparatus 10-2 includes, although not illustrated in FIG. 1, as a transmitting system, the transponders 11 and the multiplexer 12, similarly to the transmitting system of the optical transmission apparatus 10-1. However, the transponders 11 (or transponders 16) may be commonly used both for transmission and reception. In other words, the transponders 11 and 16 may have the same configuration (transmitting and receiving sections).

Figure 2:
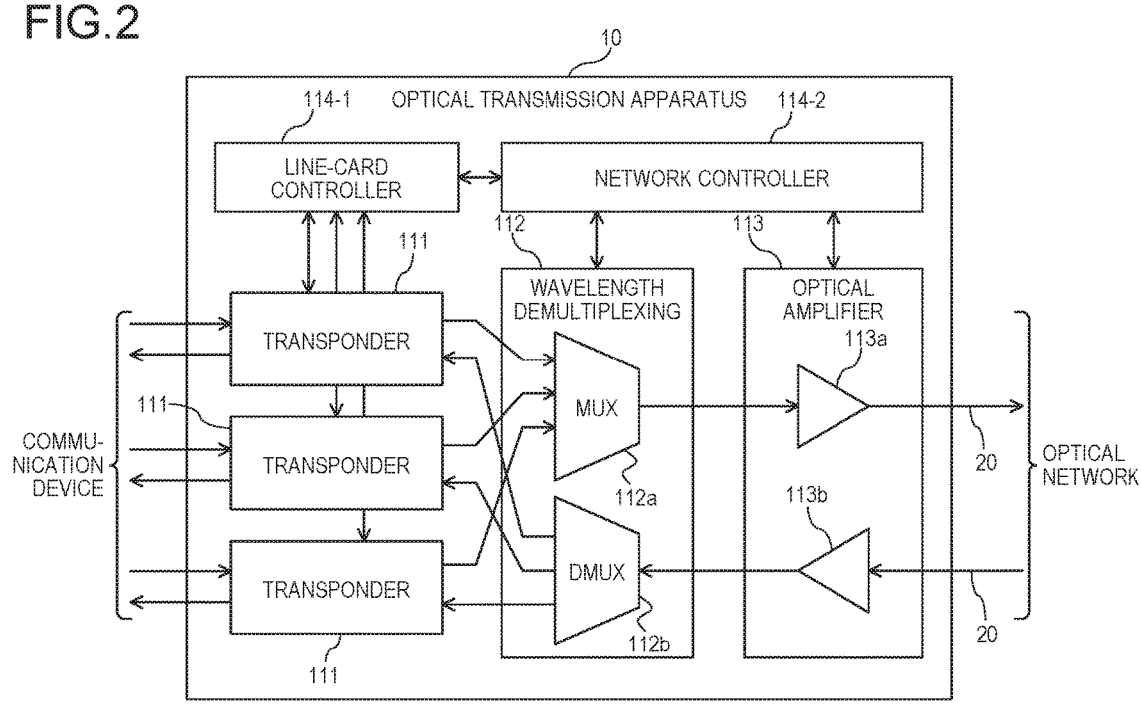
FIG. 2 is a block diagram illustrating an exemplary configuration of an optical transmission apparatus illustrated in FIG. 1.

FIG. 2 illustrates an exemplary configuration of the optical transmission apparatus 10 supporting a bidirectional communication. The optical transmission apparatus 10 illustrated in FIG. 2 includes, for example, a plurality of transponders 111, a wavelength demultiplexing block 112, an optical amplifier block 113, a line-card controller 114-1, and a network controller 114-2. The "block" may be referred to as a "module."

Each of the transponders 111 may be regarded as corresponding to the transponder 11 (or 16) illustrated in FIG. 1. By way of example, each of the transponders 111 is optically connected to the communication device 40 (or 50) such as a router to enable the bidirectional communication, and can transmit and receive an optical signal with the communication device 40 (or 50).

The wavelength demultiplexing block 112 includes, for example, a multiplexer (MUX) 112a corresponding to the upstream direction, and a demultiplexer (DMUX) 112b corresponding to the downstream direction. It may be understood that the multiplexer 112a is equivalent to the multiplexer 12 illustrated in FIG. 1, and the demultiplexer 112b is equivalent to the demultiplexer 15 illustrated in FIG. 1.

An output port (a transmission port) of each of the transponders 111 may be optically connected to an input port of the multiplexer 112a using an optical fiber or the like. Further, an input port (reception port) of each of the transponders 111 may be optically connected to any one of output ports of the demultiplexer 112b using an optical fiber or the like.

Thus, the multiplexer 112a generates a WDM optical signal by wavelength-multiplexing an optical signal transmitted from the transmission port of each of the transponders 111. Further, the demultiplexer 112b de-muliplexes the WDM optical signal received from the optical amplifier block 113 for each wavelength and inputs the de-multiplexed signal to the reception port of each of the transponders 111.

The optical amplifier block 113 may include an optical amplifier 113a corresponding to the upstream direction, and an optical amplifier 113b corresponding to the downstream direction. The optical amplifier 113a amplifies the WDM optical signal input from the multiplexer 112a with a predetermined transmission power, and transmits the amplified signal to the optical transmission line 20. The optical amplifier 113b amplifies the WDM optical signal received from the optical transmission line 20 with a predetermined reception power, and inputs the amplified signal to the demultiplexer 112b.

In some cases, the optical amplifier block 113 may be unnecessary depending on the transmission distance of the WDM optical signal.

The line-card controller 114-1 is electrically or optically connected to each of the transponders 111 and performs a switching processing according to the destination of data received by the line-card controller 114-1.

Thus, the "line-card controller" may be referred to as a "switching part" or a "switching board." The switched data is transmitted, via each of the transponders 111, to the side of the communication device 40 or the optical transmission line 20 (optical network).

The network controller 114-2 collectively controls the operations of the line-card controller 114-1, the wavelength demultiplexing block 112 and the optical amplifier block 113. The line-card controller 114-1 and the network controller 114-2 may be integrated as a single controller. If the line-card controller 114-1 and the network controller 114-2 may not be distinguished from each other, the line-card controller 114-1 or the network controller 114-2 may be simply referred to as a "controller 114."

Figure 3:
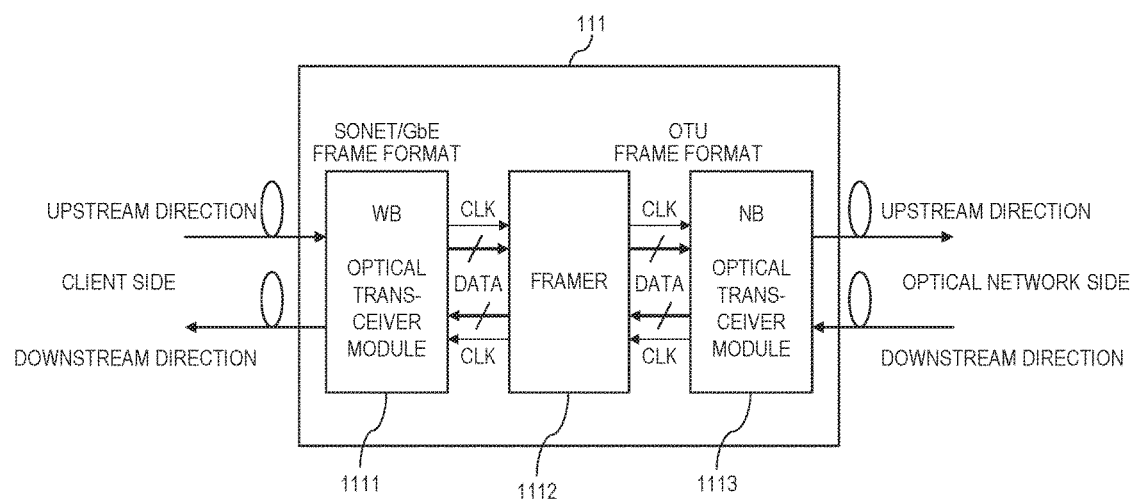
FIG. 3 is a block diagram illustrating an exemplary configuration of a transponder illustrated in FIG. 2.

FIG. 3 illustrates an exemplary configuration of the transponder 111 illustrated in FIG. 2. By way of example, the transponder 111 includes a wideband (WB) optical transceiver module 1111, a framer 1112, and a narrowband (NB) optical transceiver module 1113. The "optical transceiver module" may be referred to as "optical transceiver."

By way of example, the WB optical transceiver module 1111 transmits and receives a signal to and from the client-side communication device 40 (or 50) such as a router by using wideband light (hereinafter sometimes referred to as "WB light"). The signal transmitted and received by the WB light may be, for example, a frame signal used in synchronous optical network (SONET), Ethernet (registered trademark) or the like.

For example, the WB optical transceiver module 1111 converts the WB light received from the communication device 40 (or 50) into an electrical signal and inputs the electrical signal to the framer 1112. Further, the WB optical transceiver module 1111 converts the electrical signal received from the framer 1112 into WB light, and transmits the WB light to the communication device 40 (or 50).

By way of example, the framer 1112 maps the signal photoelectrically converted by the WB optical transceiver module 1111 to, for example, an optical channel transport unit (OTU) frame signal and inputs the OTU frame signal to the NB optical transceiver module 1113. Further, the framer 1112 demaps the frame signal of the SONET, Ethernet (registered trademark) or the like to be input to the WB optical transceiver module 1111. The frame signal is mapped to the OTU frame signal from the NB optical transceiver module 1113. The processing of the frame signal may include a process of adding such an error correcting code.

By way of example, the NB optical transceiver module 1113 transmits and receives a frame signal (e.g., OTN frame signal) to and from the optical transmission line 20 by using narrowband light (hereinafter sometimes referred to as "NB light").

For example, the NB optical transceiver module 1113 converts the OTU frame signal of the electrical signal, generated by the framer 1112, into NB light, and outputs the NB light to the multiplexer 112a illustrated in FIG. 2. Further, the NB optical transceiver module 1113 converts, for example, the OTN frame signal input as the NB light from the demultiplexer 112b illustrated in FIG. 2 into an electrical signal, and outputs the electrical signal to the framer 1112.

As described above, the transponder 111 enables a bidirectional communication between the communication device 40 and the communication device 50 through the conversion process of the light and the frame signal to be transmitted and received between the tributary side and the network (optical transmission line 20) side.

Figure 4A:
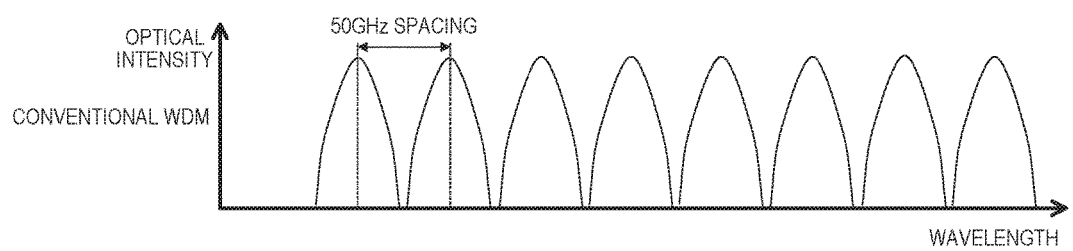
FIG. 4A illustrates an example of channel arrangement of a conventional WDM optical signal.

Meanwhile, in the optical transmission technology, for an even larger capacity, in addition to the WDM technology, the use of a technique called "Super Channel" is being considered and discussed. In the previous WDM technology, a wavelength spacing has been set such that an inter-channel interference can be suppressed sufficiently. For example, as illustrated in FIG. 4A, in the case of the optical signal of 100 Gbps per channel, channels may be arranged at a spacing of about 50 GHz in the WDM optical signal.

In contrast, in the super-channel technology, by using a spectrum shaping processing through digital signal processing, it is possible to further narrow a channel spacing while suppressing the inter-channel interference. For example, by performing a convolution processing of a main signal (e.g., NRZ signal) by using a filter such as a raised cosine filter that exhibits a time response in a Sinc function shape, the frequency spectrum of the main signal light can be narrowed and shaped into a rectangular shape.

Figure 4B:
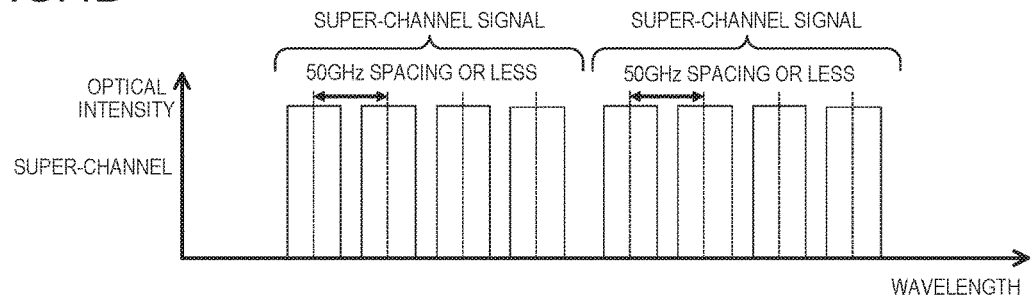
FIG. 4B illustrates an example of channel arrangement of a super-channel signal.

Thus, in the case of the optical signal of 100 Gbps per channel, for example, as illustrated in FIG. 4B, the channel spacing in the WDM optical signal can be approximated to a spacing narrower than 50 GHz (e.g., about 36 GHz).

If a variation (may be referred to as "fluctuation") occurs in the emission wavelength of a transmission light source (e.g., a laser diode LD), a margin may be set in the channel spacing in consideration of the fluctuation. The LD may be a variable wavelength tunable LD.

For example, if the emission wavelength of the LD varies in a certain frequency range (e.g., ±1.5 GHz) due to environmental conditions, a temporal change or the like, the corresponding frequency range may be set as the margin of the channel spacing. The variation of the emission wavelength of the LD may be referred to as an End Of Life (EOL) variation.

If a frequency bandwidth per channel could be narrowed to 32 GHz by spectrum shaping processing, the frequency bandwidth per channel becomes 35 GHz considering a margin of ±1.5 GHz (3 GHz) as EOL variation. Thus, when each channel is arranged such that a guard band of 1 GHz is sandwiched between channels, the channel spacing becomes 36 GHz.

Here, it is assumed that multiple channels are arranged (multiplexed) in a certain frequency band such as, for example, a transmission band of a wavelength selection switch (WSS) through which the WDM optical signal passes (may be referred to as a "frequency grid"). Meanwhile, the WSS is an example of an optical device used in the optical transmission apparatus 10, and its transmission band is an example of a parameter which affects the transmission characteristics such as the band characteristics of the WDM optical signal.

In the transmission band of the WSS, a difference between a frequency corresponding to an edge of the transmission band and a frequency corresponding to an edge of the channel closest to the frequency may be referred to as an "outer peripheral margin." If a large outer peripheral margin is secured, it is possible to suppress a degradation of the transmission characteristics in the multi-span transmission of the WDM optical signal.

Figure 5:
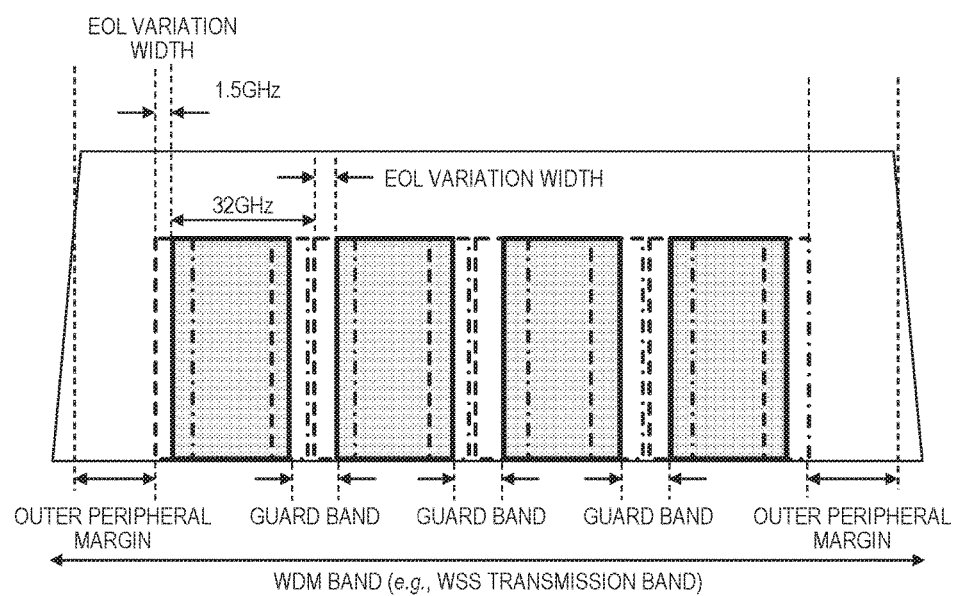
FIG. 5 is a diagram explaining an outer peripheral margin that can be secured when the transmission wavelength control is not performed in the channel arrangement illustrated in FIG. 4B.

As a non-limiting example, as illustrated in FIG. 5, assuming that four channels are multiplexed in the frequency grid of 162.5 GHz, a margin of about 7.5 GHz is secured as the outer peripheral margin.

However, the margin of this degree may lead to a non-negligible increase in degradation of the transmission characteristics in the multi-span transmission. In addition, the frequency utilization efficiency in this case only increases by about 23.1% as compared to the case of a channel spacing of 50 GHz in the conventional WDM transmission illustrated in FIG. 4A (e.g., refer to Table 1 below).

In order to practically realize the super-channel, it is desired to improve the transmission characteristics by ensuring the outer peripheral margin having a larger width. Alternatively, for an even larger-capacity transmission, it is desired to further improve the frequency utilization efficiency.

Therefore, for example, by adaptively controlling the emission wavelength of the transmission LD during the operation of the optical network or the optical transmission apparatus, it may be considered that the outer peripheral margin that is secured may be expanded by suppressing the fluctuation of the emission wavelength of the transmission LD.

In the channel arrangement of the super-channel illustrated in FIG. 5, if the wavelength control of the transmission LD is not implemented, as a variation of the transmission LD, the variation of four channels (frequency) in a lateral direction (a total of eight locations) is considered a margin.

Figure 6:
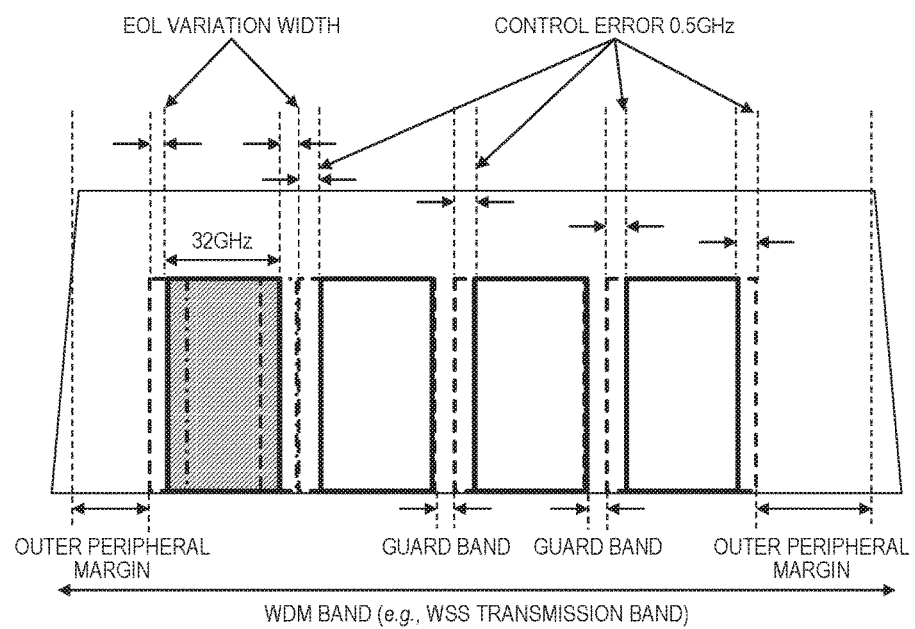
FIG. 6 is a diagram explaining an outer peripheral margin that can be secured when the transmission wavelength control is performed in the channel arrangement illustrated in FIG. 4B.

In contrast, for example, as illustrated in FIG. 6, if the wavelength control of the transmission LD is implemented using one channel among four channels as a reference channel, the variation of the other three channels may not be expected to be considered as a margin.

Meanwhile, the reference channel is a channel outside the scope of channels for the wavelength control. In other words, only the variation for the reference channel among the four channels may be expected to be considered as a margin. However, a wavelength control error (e.g., about 500 MHz) may be expected to be considered.

By implementing the wavelength control, for example, as represented in Example 1 in Table 1 below, it is possible to ensure about 11 GHz as the outer peripheral margin, thereby suppressing the degradation of the transmission characteristics in the multi-span transmission.

TABLE 1

Specific example of channel arrangement

|  | Wavelength not controlled | | Wavelength controlled (Example 1) | | Wavelength controlled (Example 2) | |
| --- | --- | --- | --- | --- | --- | --- |
| Required band | 162.5 GHz | | 162.5 GHz | | 150.0 GHz | |
| Number of channels | 4 CH | | 4 CH | | 4 CH | |
| Band utilization efficiency (compared to conventional) | 23.1% | | 23.1% | | 33.3% | |
| Signal band | 32.0 GHz | ×4 | 32.0 GHz | ×4 | 32.0 GHz | ×4 |
| Light source variation | 1.5 GHz | ×8 | 1.5 GHz | ×2 | 1.5 GHz | ×2 |
| Light source control error | 0.5 GHz | ×0 | 0.5 GHz | ×4 | 0.5 GHz | ×4 |
| Guard band between channels | 2.5 GHz | ×3 | 2.5 GHz | ×3 | 2.5 GHz | ×3 |
| Outer peripheral margin | 7.5 GHz | ×2 | 11.0 GHz | ×2 | 4.8 GHz | ×2 |

Alternatively, as represented in Example 2 in Table 1, although the outer peripheral margin that can be secured is smaller than that in Example 1, it becomes practically possible to multiplex four channels with a grid of 150.0 GHz. In Example 2, it is possible to greatly improve the frequency utilization efficiency (e.g., 33.3%) as compared to 23.1% in Example 1.

Next, a transmission signal and a reception signal of the super channel will be described with reference to FIG. 7. Each of transmitters A1, B1, C1 and D1 illustrated on the upper left of FIG. 7 may be regarded as corresponding to an optical transmitter in the upstream direction provided in the NB optical transceiver module 1113 of the transponder 111 (see, e.g., FIGS. 2 and 3) in the optical transmission apparatus 10-1 (see, e.g., FIG. 1).

Figure 7:
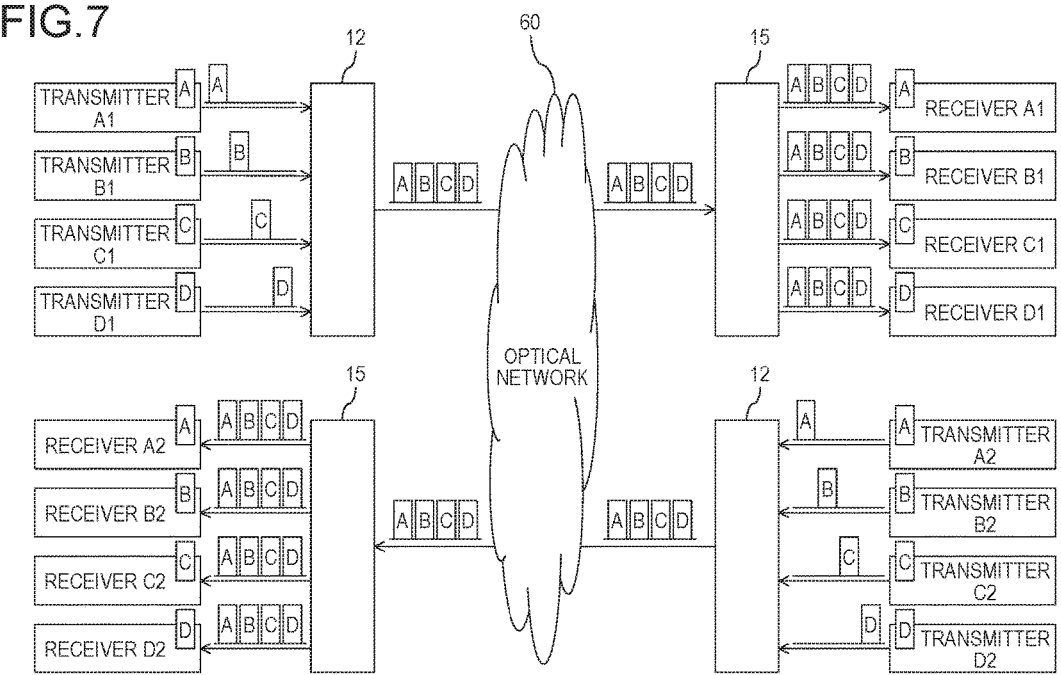
FIG. 7 is a block diagram explaining multi-channel reception in the optical transmission system illustrated in FIG. 1.

In addition, each of receivers A1, B1, C1 and D1 illustrated on the upper right of FIG. 7 may be regarded as corresponding to an optical receiver in the downstream direction provided in the NB optical transceiver module 1113 of the transponder 111 (see, e.g., FIGS. 2 and 3) in the optical transmission apparatus 10-2.

Furthermore, each of transmitters A2, B2, C2 and D2 illustrated in the lower right of FIG. 7 may be regarded as corresponding to an optical transmitter in the upstream direction provided in the NB optical transceiver module 1113 of the transponder 111 (see, e.g., FIGS. 2 and 3) in the optical transmission apparatus 10-2.

In addition, each of receivers A2, B2, C2 and D2 illustrated in the lower left of FIG. 7 may be regarded as corresponding to an optical receiver in the downstream direction provided in the NB optical transceiver module 1113 of the transponder 111 (see, e.g., FIGS. 2 and 3) in the optical transmission apparatus 10-1.

Optical signals A to D transmitted from the transmitters A1, B1, C1 and D1 (A2, B2, C2 and D2) are wavelength-multiplexed into a WDM optical signal forming a super channel in the aforementioned multiplexer 12 and transmitted to an optical network 60.

In addition, the optical signals A to D may be regarded, respectively, as optical signals having wavelengths corresponding to emission wavelengths $\lambda_A$ to $\lambda_D$ of the transmission light sources of the transmitters A1, B1, C1 and D1 (A2, B2, C2 and D2).

The wavelengths $\lambda_A$ to $\lambda_D$ forming the super channel may be referred to as "sub-channels" or "sub-carriers." Further, the optical network 60 may be regarded as a concept including the optical transmission line 20 and the optical amplifier 30 illustrated in FIG. 1.

The WDM optical signal, which is the transmission signal of the super channel transmitted to the optical network 60, is divided by the demultiplexer 15 into the number of branches corresponding to the number of the receivers A1, B1, C1 and D1 (A2, B2, C2 and D2) and input to the corresponding receivers, respectively. In other words, the receivers A1, B1, C1 and D1 (A2, B2, C2 and D2) receive the same WDM optical signal into which the optical signals A to D are wavelength-multiplexed. This reception may be referred to as "multi-channel reception" or "multi-carrier reception."

Each of the receivers A1, B1, C1 and D1 (A2, B2, C2 and D2) may include a local oscillation light source (e.g., LD) used in the coherent reception. The emission wavelength of the local oscillation light source is coincide with the emission wavelength of the transmission source of the corresponding transmitters A1, B1, C1 and D1 (A2, B2, C2 and D2). In the following description, the emission wavelength of the transmission light source may be referred to as a "transmission wavelength," and the emission wavelength of the local oscillation light source may be referred to as a "reception wavelength."

For example, the reception wavelength of the receiver A1 (A2) may be coincide with the transmission wavelength $\lambda_A$ of the transmitter A1 (A2), and the reception wavelength of the receiver B1 (B2) may be coincide with the transmission wavelength $\lambda_B$ of the transmitter B1 (B2).

Similarly, the reception wavelength of the receiver C1 (C2) may be coincide with the transmission wavelength $\lambda_C$ of the transmitter C1 (C2), and the reception wavelength of the receiver D1 (D2) may be coincide with the transmission wavelength $\lambda_D$ of the transmitter D1 (D2).

In the example of FIG. 7, the wavelengths of the optical signals transmitted from the transmitters A1 to D1 to the receivers A1 to D1 are coincide with the wavelengths of the optical signals transmitted in the reverse direction from the transmitters A2 to D2 to the receivers A2 to D2, respectively, but the wavelengths of the optical signals may well be different as well.

The receiver A1 (A2) extracts and receives a signal of the transmission wavelength $\lambda_A$ of the transmitter A1 (A2) from the WDM optical signal branched and input from the optical splitter 15. The receiver B1 (B2) extracts and receives a signal of the transmission wavelength $\lambda_B$ of the transmitter B1 (B2) from the WDM optical signal.

Similarly, the receiver C1 (C2) extracts and receives a signal of the transmission wavelength $\lambda_C$ of the transmitter C1 (C2) from the WDM optical signal. The receiver D1 (D2) extracts and receives a signal of the transmission wavelength $\lambda_D$ of the transmitter D1 (D2) from the WDM optical signal.

However, because adjacent channels are close to each other in the WDM optical signal of the super channel, a part of signal components of the adjacent channels may be included (may be expressed as "may remain") in the received signals at the receivers A1, B1, C1 and D1 (A2, B2, C2 and D2).

For example, at the receiver A1 (A2), a part of signal components of the adjacent channel (wavelength $\lambda_B$) may be included in the received signal. At the receiver B1 (B2), a part of signal components of the adjacent channels (wavelengths $\lambda_A$ and $\lambda_C$) may be included in the received signal.

At the receiver C1 (C2), a part of signal components of the adjacent channels (wavelengths $\lambda_B$ and $\lambda_D$) may be included in the received signal. At the receiver D1 (D2), a part of signal components of the adjacent channel (wavelength $\lambda_C$) may be included in the received signal.

For example, the spectrum of the reception signal may include not only the spectrum having, as a center frequency, a frequency corresponding to the wavelength of the local oscillation light source, but also the signal component spectrum of the adjacent channel at one or both of the low frequency side and high frequency side with respect to the spectrum.

Hereinafter, a method for controlling the transmission wavelength of the transmitter in the configuration illustrated in FIG. 7 will be described. For example, it is assumed that if the transmission wavelength of the transmitter D2 does not exist at an expected wavelength position, the wavelength position is controlled.

The control of the corresponding wavelength position may be realized, for example, by monitoring the channel spacing at a reception node of the WDM optical signal. If the channel spacing of the WDM optical signal can be monitored by the channel spacing monitor, it is possible to detect the transmission wavelength which is absent at an expected wavelength position. By feeding back the detection result to the corresponding transmitter, it is possible to control the transmission wavelength, which is absent at the expected wavelength position, to the original expected wavelength position.

Figure 8:
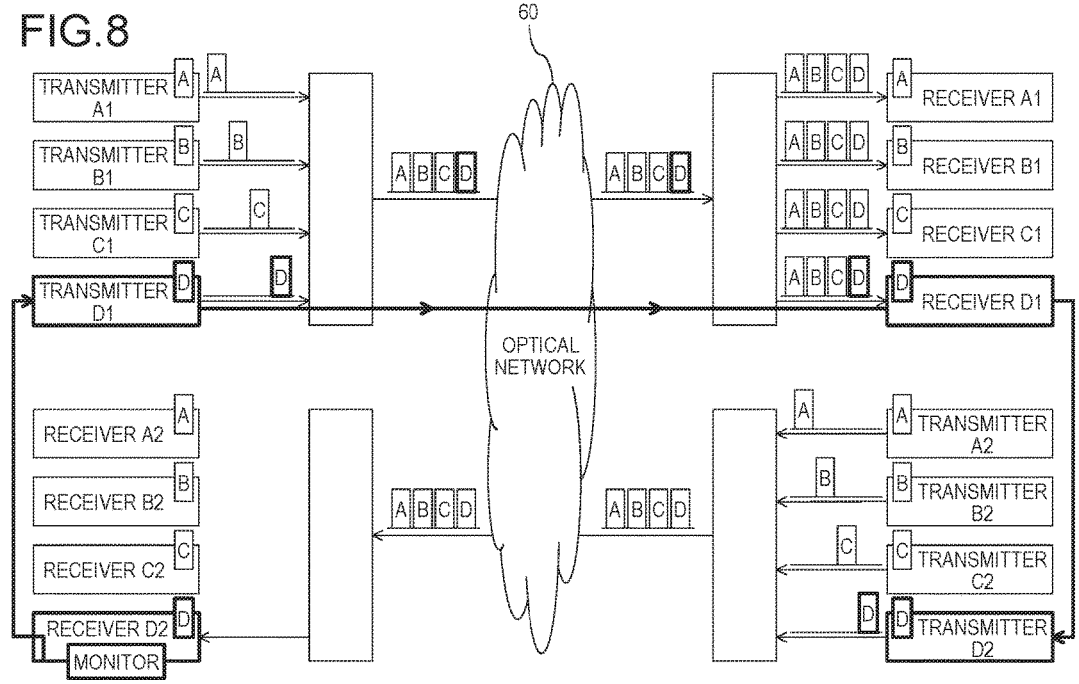
FIG. 8 is a block diagram illustrating a case where the monitoring result of the channel spacing is superimposed as a frequency modulation component on a transmission signal to the opposing station in the optical transmission system illustrated in FIG. 7.

For example, as illustrated in FIG. 8, if the channel spacing can be monitored by any one of the receivers A2 to D2 (e.g., receiver D2), a shift of the transmission wavelength of the opposing transmitter D2 can be detected (may be referred to as "measured") by the receiver D2.

By way of example, a signal obtained by receiving the WDM optical signal digitally and coherently is converted into a spectrum signal in a frequency domain from a time domain by the digital signal processing (e.g., Fast Fourier transform, FFT). The channel spacing can be detected based on the corresponding spectrum signal.

For example, if the channel spacing is narrow as in the super channel, the spectrum signal obtained by the FFT includes a part of the spectrum of the adjacent channel. The receiver may detect a width of a gap between channels based on the spectrum.

In the FFT calculation result itself, a fluctuation range in a power direction is large, and unnecessary peaks may appear in a section of the gap between channels. Thus, the FFT calculation result may be subject to a smoothing process using a method such as a moving average.

The "channel spacing" usually means a distance between a center wavelength of one channel and a center wavelength of an adjacent channel. However, as illustrated in FIG. 4B, in the super channel, since the spectrum of each sub-channel is of a rectangular shape, the width of the spectrum may be considered corresponding to the width of the rectangle.

For example, the width of the spectrum per sub-channel may be considered as 32 GHz in a full width of the rectangle and 16 GHz in a half width of the rectangle. Therefore, if the width of the gap between channels is measurable, the width of the gap can be converted into the channel spacing by calculation of "gap width (e.g., 3 GHz)+spectrum full width (e.g., 32 GHz)=channel spacing (e.g., 35 GHz)."

In order to detect the width of the gap, a determination threshold is set in the power of the spectrum of the FFT calculation result, and then, a section in which the power of the spectrum is below the determination threshold may be detected as the gap width.

The result obtained by converting the detected gap width into the channel spacing (or wavelength control information according to the result) is notified, for example, to the transmitter D2 of the opposing station through the receiver D1 of the opposing station from the transmitter D1 of FIG. 8. Accordingly, it is possible to minimize and control the shift of the transmission wavelength of the transmitter D2. In other words, a spacing between the transmission wavelengths of the transmitters A2 to D2 can be controlled to be constant. The control may be referred to as "channel spacing constant control."

By way of example, the notification of the detection result of the channel spacing may be performed by modulating the frequency of transmission light of the transmitter D1 and superimposing notification information (e.g., wavelength shift detection result or wavelength control information) on the corresponding transmission light. The notification information may be regarded as an example of supervisory control information. The transmission light on which the supervisory control information is superimposed may be regarded as light including a supervisory (SV) optical component or an optical supervisory channel (OSC) component.

The receiver D1 demodulates and detects the control notification information superimposed on the reception signal by the frequency modulation. By controlling the transmission wavelength of the transmitter D2 based on the detected notification information, it is possible to compensate the transmission wavelength shift of the transmitter D2. The transmission wavelength shift of the transmitters other than the transmitter D2 also can be compensated by feeding back the monitoring result at the corresponding receiver to the corresponding transmitter in the same manner as described above.

Here, a set of the receiver D2 and the transmitter D1 may be regarded as being included in one transponder 111 illustrated in FIG. 2. Similarly, a set of the receiver D1 and the transmitter D2 also may be regarded as being included in one transponder 111 illustrated in FIG. 2 of another node.

Thus, the transmission and reception of information between the receiver D2 (D1) and the transmitter D1 (D2) in the same transponder 111 are relatively easy, and the control of the transmission wavelength shift of the transmitter D2 (D1) also can be readily realized. For example, the control of the transmission wavelength shift may be implemented by the controller 114 illustrated in FIG. 2, or a controller (not illustrated in FIG. 2) incorporated in the transponder 111.

Thus, by monitoring the channel spacing at the receiver, it is possible to implement the wavelength control (e.g., a channel spacing constant control) at low costs without adding a monitor or a control signal path to the optical network 60. A specific example of the channel spacing constant control will be described later with reference to FIG. 11.

Meanwhile, at a node 10 which transmits the WDM optical signal of the super channel, add or drop of light may be performed on the WDM optical signal on the basis of a wavelength or a group of multiple wavelengths, for example, by using the WSS.

Figure 9:
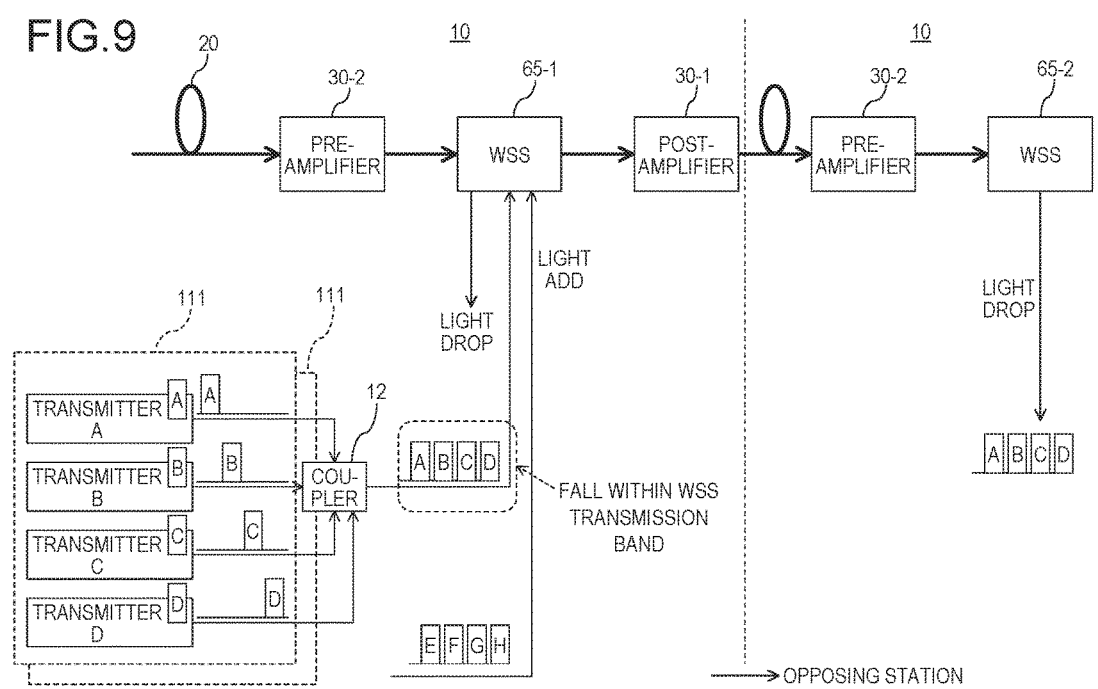
FIG. 9 is a block diagram illustrating an exemplary node configuration focusing on the add-drop function of light.

FIG. 9 schematically illustrates a state where add or drop of light is performed on a WDM optical signal by the WSS at a node 10. By way of example, FIG. 9 illustrates a state where a WDM optical signal including four wavelengths is input as add light to a WSS 65-1 from each of two transponders 111.

For example, the first transponder 111 includes transmitters A to D which correspond to four wavelengths λA to λD, respectively. The transmission light of the transmitters A to D is wavelength-multiplexed by the multiplexer 12 such as a multiplexing coupler and input to the WSS 65-1.

The second transponder 111 includes transmitters E to H which correspond to four wavelengths λE to λH, respectively. The transmission light of the transmitters E to H is wavelength-multiplexed by the multiplexer 12 such as a multiplexing coupler and input to the WSS 65-1.

The node 10 with the WSS 65-1 may be, for example, an optical relay node such as an OADM. The optical relay node 10 with the WSS 65-1, for convenience, may be referred to as a "transmission node 10" when focusing on a transmission system.

The optical relay node 10 may include, for example, an optical amplifier (pre-amplifier) 30-2 and an optical amplifier (post-amplifier) 30-1. The pre-amplifier 30-2 amplifies the WDM optical signal received from the optical transmission line 20 and inputs the amplified WDM optical signal to the WSS 65-1.

The WSS 65-1 performs add, drop, or thru on the WDM optical signal amplified by the pre-amplifier 30-2 on a wavelength basis. In the example of FIG. 9, the WSS 65-1 may output light of four wavelengths $\lambda_A$ to $\lambda_D$ or $\lambda_E$ to $\lambda_H$ input from the transponder 111 together with thru light to the post-amplifier 30-1 located at a rear stage.

The post-amplifier 30-1 amplifies the WDM optical signal input from the WSS 65-1 and transmits the amplified WDM optical signal to the optical transmission line 20.

Meanwhile, the light of the four wavelengths added by the WSS 65-1 may be dropped by using a WSS 65-2 at the node 10 corresponding to a reception destination node. The node 10 with the WSS 65-2 may be the optical relay node 10 different from the optical relay node 10 with the WSS 65-1. The optical relay node 10 with the WSS 65-2, for convenience, may be referred to as a "reception node 10" when focusing on a reception system.

The reception node 10 may include the optical amplifier (pre-amplifier) 30-2. The pre-amplifier 30-2 amplifies the WDM optical signal received from the optical transmission line 20 and inputs the amplified WDM optical signal to the WSS 65-2.

For example, the WSS 65-2 may drop light of one of the four wavelengths $\lambda_A$ to $\lambda_D$ or $\lambda_E$ to $\lambda_H$ added to the WDM optical signal at the transmission node 10.

In this case, the add wavelengths of the four wavelengths $\lambda_A$ to $\lambda_D$ or $\lambda_E$ to $\lambda_H$ passing through the WSS 65-1 (or 65-2) are set to fall within a transmission band (WSS transmission band) of the WSS 65-1.

Figure 10:
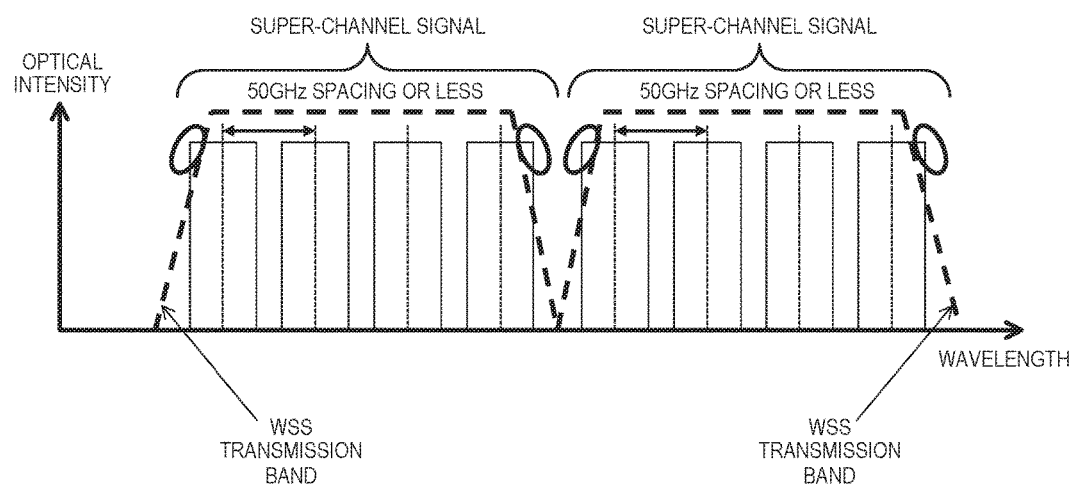
FIG. 10 is a diagram illustrating an example of a relationship between a super-channel signal and a transmission band of a wavelength selective switch.

FIG. 10 schematically illustrates an example of a relationship between a super-channel signal which is an example of a WDM optical signal, and a WSS transmission band. FIG. 10 depicts a state where sub-channel signals of four wavelengths are set for each of two WDM transmission bands indicated by a dotted line.

If an outer peripheral margin of the WSS transmission band is sufficiently secured, the spectrum of the sub-channel signals adjacent to the outer edges of the WSS transmission band is not cut by the band restriction of the outer edge of the WSS transmission band.

However, for example, even though the wavelength control is performed such that the channel spacing of the sub-channel signals becomes appropriate, if the outer peripheral margin is not taken into consideration in the wavelength control, the outer peripheral margin may not be sufficiently secured even though the channel spacing is appropriate.

In that case, as illustrated in FIG. 10, the spectrum of the sub-channel signals corresponding to the wavelengths adjacent to the outer edges of the WSS transmission band is cut by the band restriction of the outer edges of the WSS transmission band (may be referred to as "spectral narrowing"). Thus, a penalty occurs in the sub-channel signals and the signal quality degrades.

Figure 11:
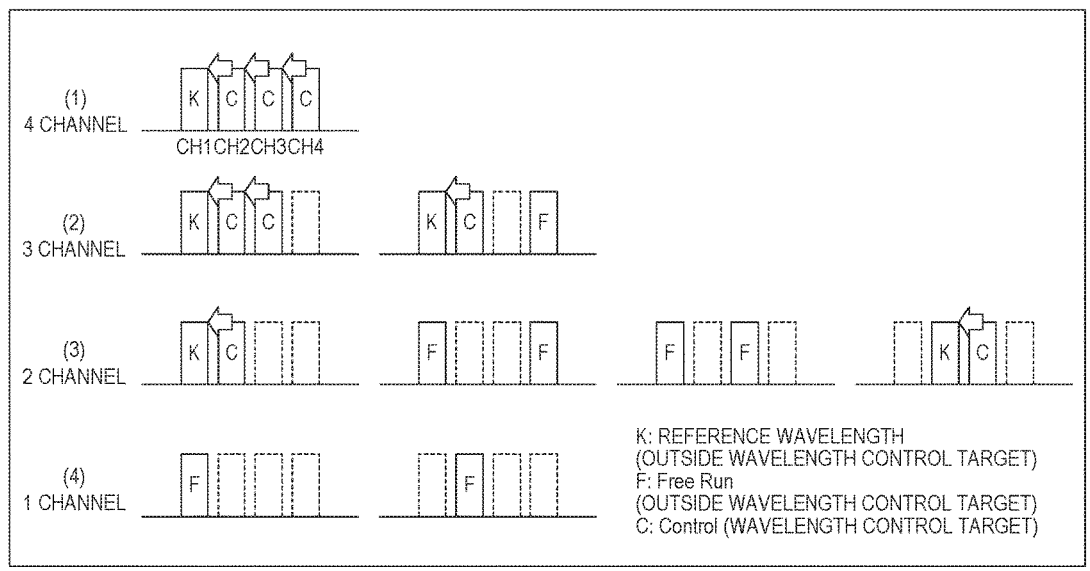
FIG. 11 is a diagram schematically illustrating an example of the wavelength control for making the channel spacing to be constant.

FIG. 11 schematically illustrates examples of the wavelength control for making the channel spacing constant. In FIG. 11, (1) to (4) represent examples of the wavelength control when the number of sub-channels in operation is four, three, two and one, respectively. Further, the "sub-channels in operation" may be referred to as "operating channels" for convenience.

If the operating channels adjacent to each other exist in the WSS transmission band, they may be controlled using one of the adjacent operating channels as a reference channel K so that the channel spacing of the operating channels becomes constant. The reference channel K may be outside a wavelength control target. The channels "adjacent" to each other in a wavelength (frequency) range may be regarded as "channels having an adjacency relationship."

If the adjacent operating channels do not exist in the WSS transmission band, the reference channel K may not be set, and the wavelength control also may not be performed.

For example, in example (1) of FIG. 11, four sub-channels have an adjacency relationship. In this case, for example, the wavelength control may be performed using the operating channel of the shortest wavelength as the reference channel K such that the channel spacing of four operating channels becomes constant.

In FIG. 11, "C" indicates a wavelength of the wavelength control target (e.g., an operating channel). The reference channel K may be the longest wavelength without being limited to the shortest wavelength in the WSS transmission band, and may be set to an intermediate wavelength between the shortest wavelength and the longest wavelength.

Example (2) of FIG. 11 represents a situation where three operating channels are adjacent (left side), and a situation where only two channels of three operating channels are adjacent (right side).

In the situation where three operating channels are adjacent, similarly to example (1) of FIG. 11, the wavelength control may be performed using the operating channel of the shortest wavelength as the reference channel K such that the channel spacing of three operating channels becomes constant.

Meanwhile, in the situation where only two channels of three operating channels are adjacent, for example, the wavelength control may be performed using the operating channel of the shortest wavelength as the reference channel K such that the channel spacing of two operating channels becomes constant. The operating channel which is not adjacent to the corresponding two operating channels may be outside the wavelength control target (free-run; F). The free-run operating channels may be referred to as "free channels."

Example (3) of FIG. 11 represents a situation where two operating channels are adjacent in the WSS transmission and a situation where two operating channels are not adjacent in the WSS transmission band. In the situation where two operating channels are adjacent, for example, the wavelength control may be performed using the operating channel on the short wavelength side as the reference channel K such that the operating channel on the long wavelength side has a constant spacing from the reference channel K. If two operating channels are not adjacent, all operating channels may be set to the free-run.

In example (4) of FIG. 11, within the WSS transmission band, since only one operating channel exists and there are no other operating channels having an adjacency relationship, the corresponding operating channel may be set to the free-run.

In the wavelength control illustrated in FIG. 11, the channel spacing of the adjacent operating channels can be controlled to be constant, but an outer peripheral margin of the free channel F or the reference channel K for the WSS transmission band may not be secured.

Therefore, even in the case of the free channel F or the reference channel K, if the operating channel adjacent to the free channel F or the reference channel K does not exist (e.g., lost), the wavelength control for shifting the channel in a direction where the operating channel is absent may be performed temporarily.

For example, the wavelength of the outer edge channel having lost an adjacency relationship due to the loss of a channel may be shifted and controlled by a predetermined frequency in a direction toward the lost wavelength. The "direction toward the lost wavelength" is not only a "direction away from the outer edge of the WSS transmission band," but also a "direction toward the center of the WSS transmission band."

The "outer edge channel" corresponds to a channel which is closest to the outer edge (i.e., adjacent to the outer edge) of the WSS transmission band. The "loss of a channel" may occur, as a non-limiting example, when a channel that becomes no longer necessary is deleted according to a change in the path (degree) of the channel.

By shifting the wavelength of the outer edge channel having lost an adjacency relationship due to loss of a channel in the direction away from the outer edge of the WSS transmission band, the tolerance of the outer peripheral margin for the outer edge of the WSS transmission band is improved. Thus, it is possible to improve the signal quality of the outer edge channel.

Figure 12:
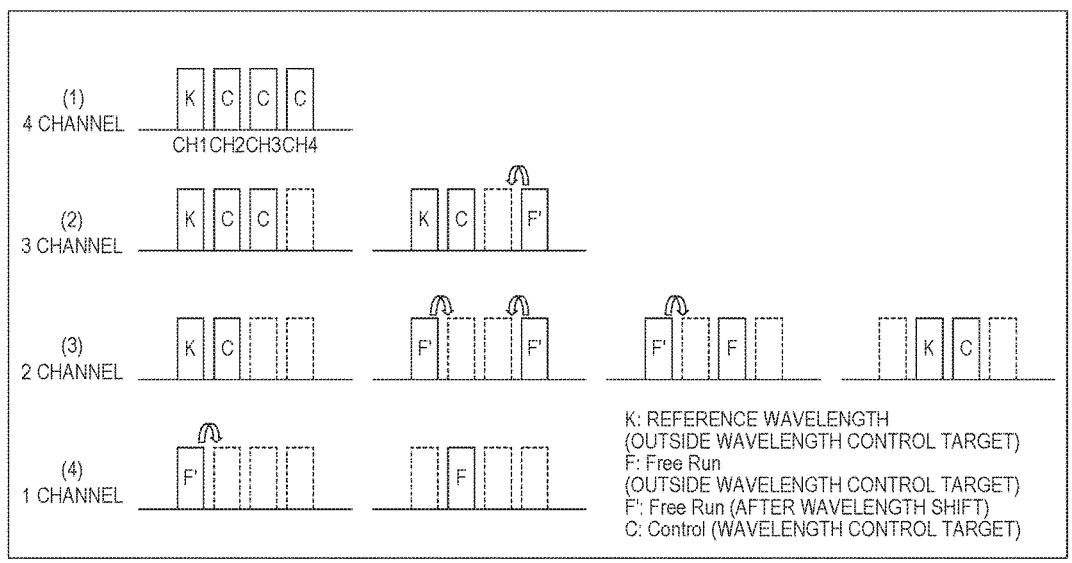
FIG. 12 is a schematic diagram explaining the wavelength control according to an embodiment in comparison with FIG. 11.

FIG. 12 illustrates examples of the corresponding wavelength control in comparison with FIG. 11. In FIG. 12, (1) to (4) represent examples of the wavelength control when the number of operating channels is four, three, two and one, respectively, in the same manner as the examples of FIG. 11.

In example (1) of FIG. 12, since all four channels have an adjacency relationship, the same channel spacing constant control as in example (1) of FIG. 11 may be performed.

Example (2) of FIG. 12 represents a situation where three operating channels are adjacent (left side) and a situation where only two channels of three operating channels are adjacent (right side). In the situation where three operating channels are adjacent, the same channel spacing constant control as in example (2) of FIG. 11 may be performed.

In this regard, in the situation where only two channels of three operating channels are adjacent, the outer edge channel of the longest wavelength, which is set to the free-run (F) mode in example (2) of FIG. 11, may be set temporarily as the wavelength control target as illustrated in (2) of FIG. 12.

For example, the outer edge channel is shifted by a predetermined frequency in the direction away from the outer edge of the WSS transmission band, and then is set to the free-run mode. The wavelength control of shifting the outer edge channel by a predetermined frequency may be performed only once.

The wavelength shift control being performed only once may be referred to as "one-shot wavelength control" for convenience. FIG. 12 represents a free channel of a temporary wavelength control target (one-shot wavelength control target) as "F'." However, the "one-shot wavelength control" is merely a convenient appellation, and as described below, stepwise wavelength control over multiple times may be included in the "one-shot wavelength control."

Example (3) of FIG. 12, similarly to example (3) of FIG. 11, represents a situation where two operating channels are adjacent in the WSS transmission band and a situation where two operating channels are not adjacent in the WSS transmission band. In the situation where two operating channels are adjacent, the same channel spacing constant control as in example (3) of FIG. 11 may be performed.

In contrast, if two operating channels are not adjacent and one or both of the operating channels correspond to the outer edge channels, similarly to example (2) of FIG. 12, the outer edge channels may be set as the one-shot wavelength control target F'. For example, the outer edge channel is shifted by a predetermined frequency in the direction away from the outer edge of the WSS transmission band, and then is set to the free-run mode.

In example (4) of FIG. 12, in the WSS transmission band, only one operating channel exists and there are no other operating channels having an adjacency relationship. In the example (4) of FIG. 11, the operating channel has been set to the free-run (F) mode. However, in example (4) of FIG. 12, if the operating channel is equivalent to the outer edge channel, the outer edge channel may be set as the one-shot wavelength control target F'. For example, the outer edge channel is shifted by a predetermined frequency in the direction away from the outer edge of the WSS transmission band, and then is set to the free-run mode.

Figure 13:
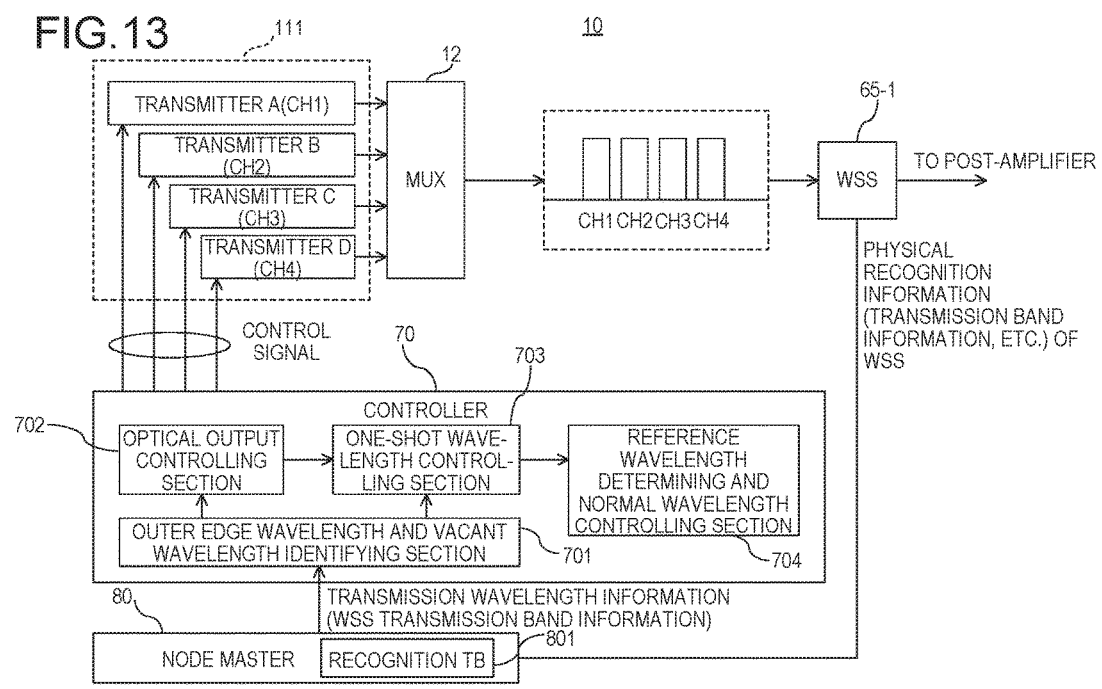
FIG. 13 is a block diagram illustrating an exemplary configuration of a transmission node capable of performing the wavelength control illustrated in FIG. 12.

Next, FIG. 13 illustrates a configuration example of the transmission node 10 capable of performing the temporary wavelength control as described above. The transmission node 10 illustrated in FIG. 13 includes, for example, a transponder 111, a multiplexer 12, a WSS 65-1, and a controller 70.

The controller 70 may be regarded as corresponding to the line-card controller 114-2 illustrated in FIG. 2, or being provided in the line-card controller 114-2. The controller 70 may be communicatively connected to a node master 80 which controls the overall operation of the transmission node 10.

The node master 80 may be provided inside the transmission node 10, or may be provided outside the transmission node 10. The node master 80 provided inside the transmission node 10 may be constructed integrally with the controller 70.

The node master 80 provided outside the transmission node 10 may be regarded as corresponding to, for example, an operating system (OPS) that manages the operation of the WDM optical network 1 (see, e.g., FIG. 1), or a network management system (NMS).

The node master 80 may correspond to an operator terminal connectable to the controller 70 of the node 10. The operator terminal is, for example, a terminal being operated by a network administrator of the WDM optical network 1.

By way of example, the transponder 111 may include transmitters A to D which correspond to sub-channels CH1 to CH4 of four wavelengths forming the super-channel signal. Each of the transmitters A to D includes, for example, a tunable LD as an example of a transmission light source, and the emission wavelength of each of the transmitters A to D can be changed by controlling the tunable LD.

The multiplexer 12 wavelength-multiplexes the optical signal transmitted from each of the transmitters A to D and outputs the wavelength-multiplexed optical signal to the WSS 65-1.

The controller 70 may include, for example, an outer edge wavelength and vacant wavelength identifying section 701, an optical output controlling section 702, a one-shot wavelength controlling section 703, and a reference wavelength determining and normal wavelength controlling section 704.

The outer edge wavelength and vacant wavelength identifying section 701 can identify a channel corresponding to the outer edge channel and a free channel in the WSS transmission band, for example, based on transmission wavelength information and WSS transmission band information. The transmission wavelength information and the WSS transmission band information, for example, may be provided from the node master 80.

The transmission wavelength information may include information identifying the wavelength to be transmitted, and information identifying the number of wavelengths to be transmitted. The WSS transmission band information may be managed, for example, by a WSS recognition table 801 in the node master 80. The WSS recognition table 801 may be stored in a storage unit or device such as a memory provided in the node master 80.

The node master 80 may communicate with the WSS 65-1, and may receive, as an example of device information stored in the memory of the WSS 65-1, the WSS transmission band information from the WSS 65-1. The node master 80 may manage the received WSS transmission band information in the WSS recognition table 801.

The optical output controlling section 702 may individually control the transmission and stop of the output light of each of the transmitters A to D (e.g., ON and OFF of a transmission LD), and also may control the shift of the emission wavelength of the transmission LD (transmission wavelength).

The one-shot wavelength controlling section 703 identifies whether there is an outer edge channel which is a free channel having lost an adjacency relationship as the transmission light of a certain wavelength is stopped (i.e., a vacant wavelength is generated) by the optical output controlling section 702. The outer edge channel which is a free channel may be referred to as an "outer edge free channel."

If the outer edge free channel exists, the one-shot wavelength controlling section 703 determines, for example, the outer edge free channel as the one-shot wavelength control target. Then, the one-shot wavelength controlling section 703 controls the transmission LD of the corresponding transmitter (transmission wavelength) such that the outer edge free channel determined as the one-shot wavelength control target is shifted by a predetermined frequency in the direction away from the outer edge of the WSS transmission band. The "direction away from the outer edge of the WSS transmission band" is not only a "direction toward the center of the WSS transmission band," but also a "direction in which a vacant wavelength is generated in a wavelength region."

When the one-shot wavelength control of the outer edge free channel is completed, for example, the one-shot wavelength controlling section 703 may notify the completion to the reference wavelength determining and normal wavelength controlling section 704.

The reference wavelength determining and normal wavelength controlling section 704 may determine the reference channel K for the channel spacing constant control, as described above in FIGS. 11 and 12, in response to receiving the wavelength control completion notification from the one-shot wavelength controlling section 703.

The reference wavelength determining and normal wavelength controlling section 704 may perform the channel spacing constant control on the adjacent channel such that the adjacent channel of the determined reference channel K has a constant spacing from the reference channel K. A channel having no adjacency relationship may be set as a free channel.

Next, an operation example of the node 10 capable of performing the one-shot wavelength control mentioned above will be described with reference to FIGS. 14 and 15.

First, it is assumed that each of the transmitters A to D of the transponder 111 transmits signal light (i.e., all the sub-channels CH1 to CH4 of four wavelengths are in operation).

In addition, it is assumed that the channel spacing constant control, for example, as illustrated in FIG. 10 is performed on the operating channels (wavelengths) CH1 to CH4. The corresponding channel spacing constant control may be carried out, for example, by the reference wavelength determining and normal wavelength controlling section 704 of the controller 70.

Figure 14:
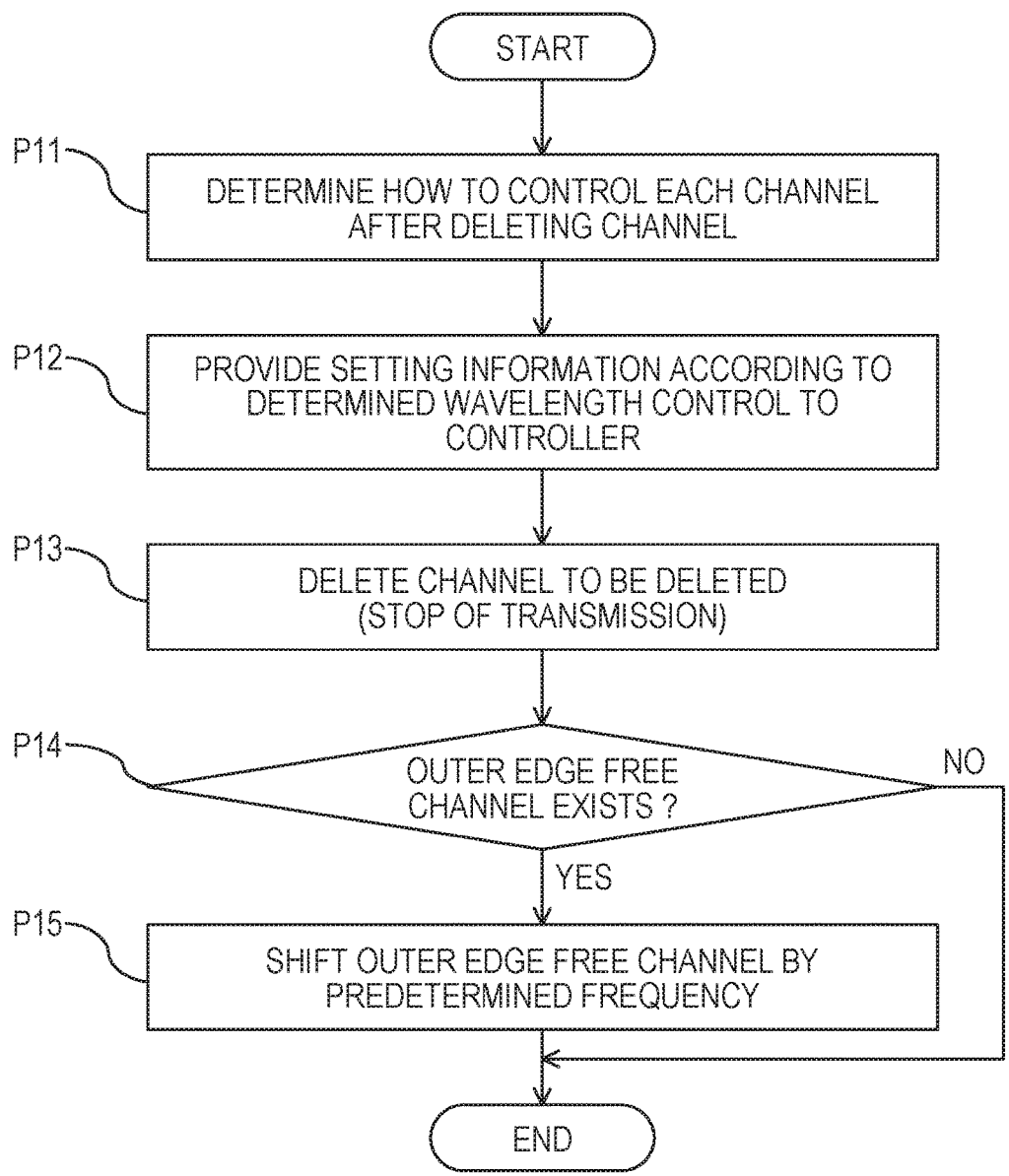
FIG. 14 is a flowchart illustrating an operation example of the transmission node illustrated in FIG. 13.

In the state where the sub-channels CH1 to CH4 are in operation, for example, as illustrated in FIG. 14, if any one of the operating channels (wavelengths) CH1 to CH4 is deleted, the node master 80 determines how to control the wavelengths of the remaining operating channels (operation P11).

The node master 80 provides wavelength control setting information according to the determined wavelength control to the controller 70 (operation P12). The wavelength control setting information may include information indicating the wavelength to be deleted, and the above-described WSS transmission band information. Since the remaining transmission wavelengths can be identified based on the information indicating the wavelength to be deleted, the information indicating the wavelength to be deleted may be regarded as a kind of the aforementioned transmission wavelength information.

If the channel to be deleted is the reference channel, the node master 80 may set another channel as a new reference channel. For the channel that has lost the reference accompanied by the deletion of the channel, the node master 80 may stop the wavelength control and set the channel as a free run.

As a non-limiting example, it is assumed that the wavelength to be deleted is a wavelength CH3. The wavelength CH3 is an example of a second wavelength adjacent to the outer edge channel CH4 which is an example of a first wavelength.

The controller 70, for example, at the outer edge wavelength and vacant wavelength identifying section 701, identifies the wavelength CH3 to be deleted and the outer edge channels CH1 and CH4 based on the wavelength control setting information received from the node master 80.

Depending on the identification of the wavelength CH3 to be deleted, the outer edge wavelength and vacant wavelength identifying section 701 instructs deletion of the wavelength CH3 (stop of transmission) to the optical output controlling section 702. The optical output controlling section 702, in response to receiving the deletion instruction of the wavelength CH3, stops the driving of the transmission LD of the transmitter C corresponding to the wavelength CH3 (operation P13).

Meanwhile, the outer edge wavelength and vacant wavelength identifying section 701 determines (or identifies)

whether the outer edge channel which is a free channel exists in accordance with the deletion of the wavelength CH3 (operation P14). In other words, the outer edge wavelength and vacant wavelength identifying section 701 determines whether any one of the identified outer edge channels CH1 and CH4 becomes a free channel having no adjacent channel.

As a result of the determination, when it is determined that the outer edge channel which is a free channel exists (YES in operation P14), the outer edge wavelength and vacant wavelength identifying section 701 determines the identified outer edge channel as the one-shot wavelength control target.

Figure 15:
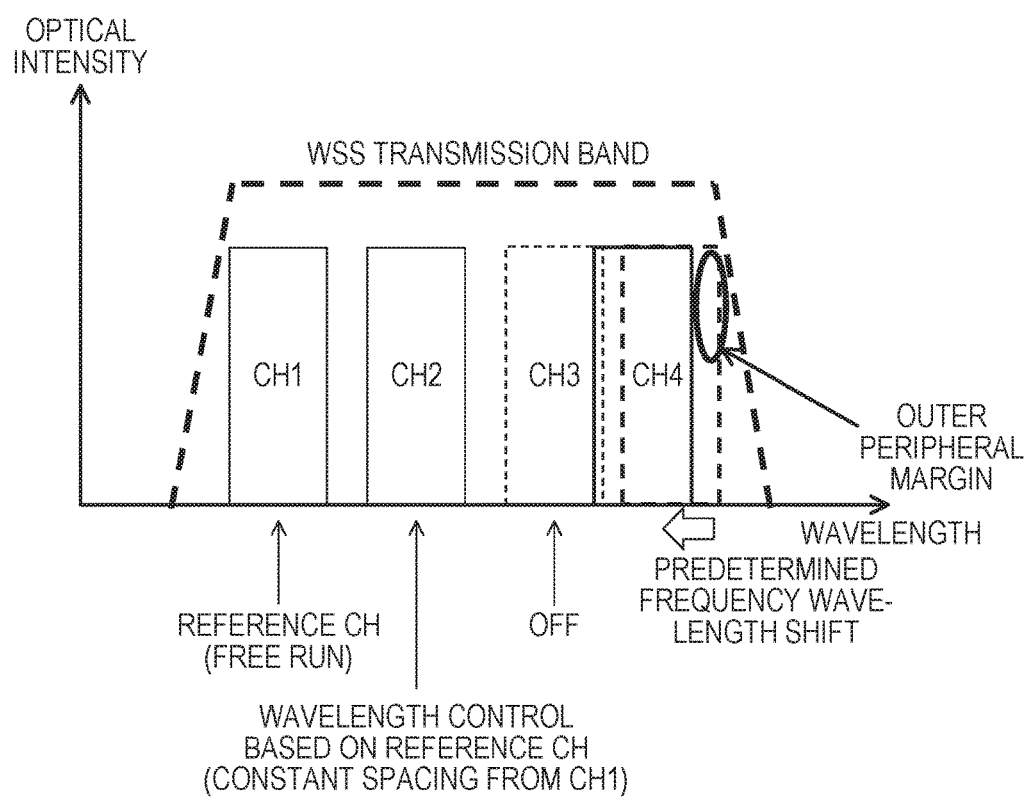
FIG. 15 is a diagram illustrating an example of a relationship between the channel and the WSS transmission band in the operation example illustrated in FIG. 14.

For example, as illustrated in FIG. 15, if the wavelength CH3 is deleted, the wavelength CH4 adjacent to the deleted wavelength CH3 loses an adjacency relationship. Since the wavelength CH4 is equivalent to the outer edge channel adjacent to the outer edge on the long wavelength side of the WSS transmission band, the wavelength CH4 corresponds to the outer edge channel which is a free channel.

Therefore, the outer edge wavelength and vacant wavelength identifying section 701 determines the outer edge channel CH4 as the one-shot wavelength control target. Alternatively or additionally, if the wavelength CH2 is deleted, since the outer edge channel CH1 also becomes a free channel, the outer edge channel CH1 is selected as the one-shot wavelength control target.

Depending on the determination of the one-shot wavelength control target, the one-shot wavelength controlling section 703 controls the transmission LD of the transmitter D corresponding to the outer edge channel CH4 such that the outer edge channel CH4 is shifted by a predetermined frequency toward the short wavelength side (operation P15). After the control, the outer edge channel CH4 may be set to the free-run mode.

The frequency to be shifted in the one-shot wavelength control (also referred to as a "wavelength shift amount") may be determined according to the spectrum width of the outer edge channel CH4. For example, the wavelength shift amount may be set in a range so as not to interfere with the operating channel CH2 located in the wavelength shift direction without causing the spectral narrowing in the outer edge channel CH4.

Figure 16:
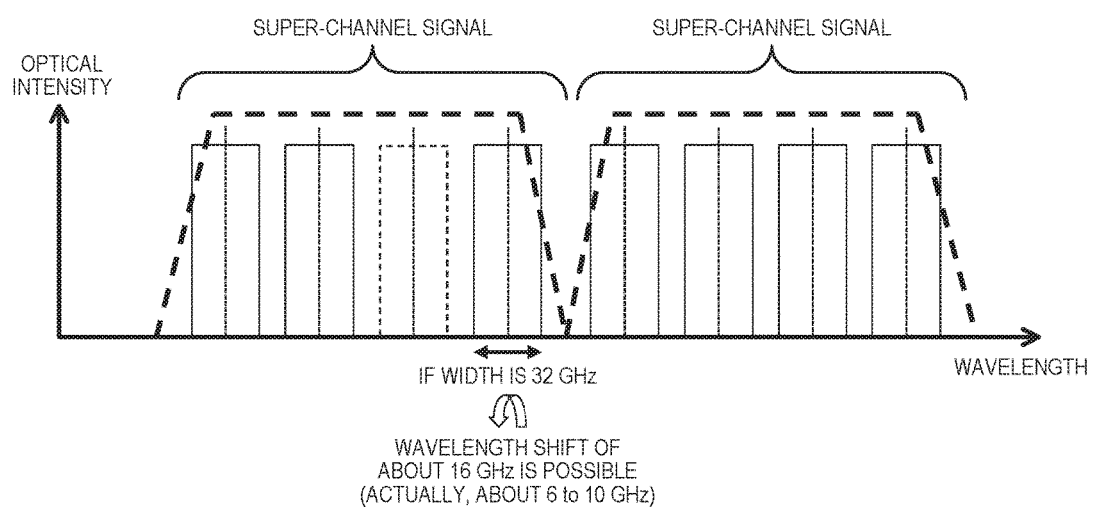
FIG. 16 is a diagram explaining an example of the wavelength shift amount in the operation example illustrated in FIG. 14.

As a non-limiting example, as illustrated in FIG. 16, if the spectrum width per sub-channel signal is assumed to be 32 GHz, since the adjacent wavelength CH3 is lost, the wavelength shift amount may be set to about 16 GHz which is equivalent to half the spectrum width.

The wavelength shift may be carried out collectively by the set wavelength shift amount, or may be carried out step-by-step multiple times. For example, if the wavelength shift amount that can be shifted while the transmission LD is caused to emit light (i.e., without generating the interruption of signal light) is assumed to be about 6 to 10 GHz, the wavelength shift may be carried out multiple times by the wavelength shift amount of about 6 to 10 GHz each time.

In response to the determination of the one-shot wavelength control target (wavelength CH4), the outer edge wavelength and vacant wavelength identifying section 701 generates a signal indicating performing the one-shot wavelength control on the wavelength CH4, and provides the signal to the reference wavelength determining and normal wavelength controlling section 704.

In response to the reception of the signal, the reference wavelength determining and normal wavelength controlling section 704 may perform (continue) the channel spacing constant control, as illustrated in FIGS. 11 and 12, on the wavelengths CH1 and CH2 other than the wavelength CH4 of the one-shot wavelength control target.

For example, the reference wavelength determining and normal wavelength controlling section 704 determines the reference channel K for the channel spacing constant control. In FIG. 15, for example, the wavelength CH1 of the shortest wavelength is determined as the reference channel K.

Depending on the determination of the reference channel K (CH1), the reference wavelength determining and normal wavelength controlling section 704 controls the transmission LD of the transmitter B corresponding to the wavelength CH2 such that the wavelength CH2 adjacent to the reference channel CH1 maintains a constant spacing from the reference channel CH1.

By the above processing, the operations of the transmitters A to D are as follows.

Transmitter A: free run while maintaining a set wavelength (reference channel)

Transmitter B: control of the transmission LD to make the spacing from the wavelength CH1 constant Transmitter C: optical output OFF Transmitter D: free run after controlling the transmission LD to the short wavelength side by a predetermined frequency In operation P14 of FIG. 14, if the outer edge channel which is a free channel does not exist (NO in operation P14), the processing may be ended without performing the one-shot wavelength control. In other words, the controller 70 may maintain the operation state of the transmitters A to D in the state so far.

As described above, according to the embodiment described above, the wavelength of the outer edge channel having lost an adjacency relationship due to loss of the sub-channel signal forming the super-channel signal may be controlled in the direction away from the outer edge of the WSS transmission band.

Thus, it is easy to appropriately ensure a margin of the outer edge channel for the outer edge of the WSS transmission band. As illustrated in FIG. 10, it is easy to avoid the occurrence of the spectral narrowing in the outer edge channel, thereby suppressing the signal quality degradation of the outer edge channel.

MODIFIED EXAMPLE 1

The above-described example is an example of determining the outer edge channel which is a free channel as the one-shot wavelength control target. However, the outer edge channel which is not a free channel or an intermediate channel which is set between two outer edge channels may be determined additionally as the one-shot wavelength control target.

Figure 17:
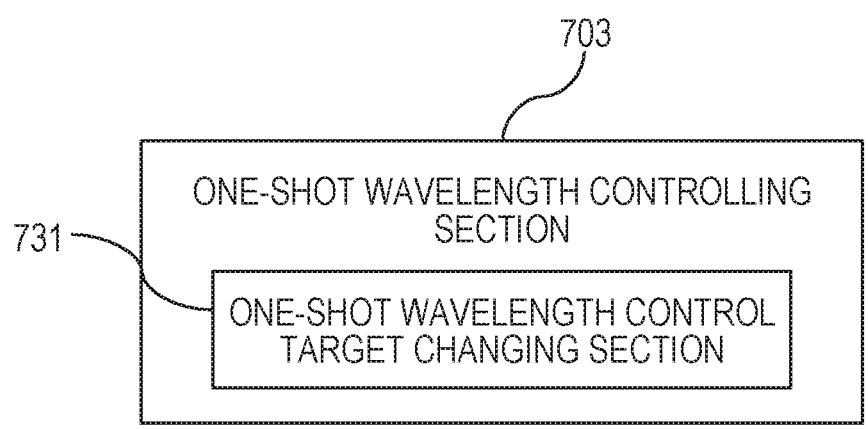
FIG. 17 is a block diagram illustrating Modified Example 1 of a one-shot wavelength controlling section illustrated in FIG. 13.
Figure 18:
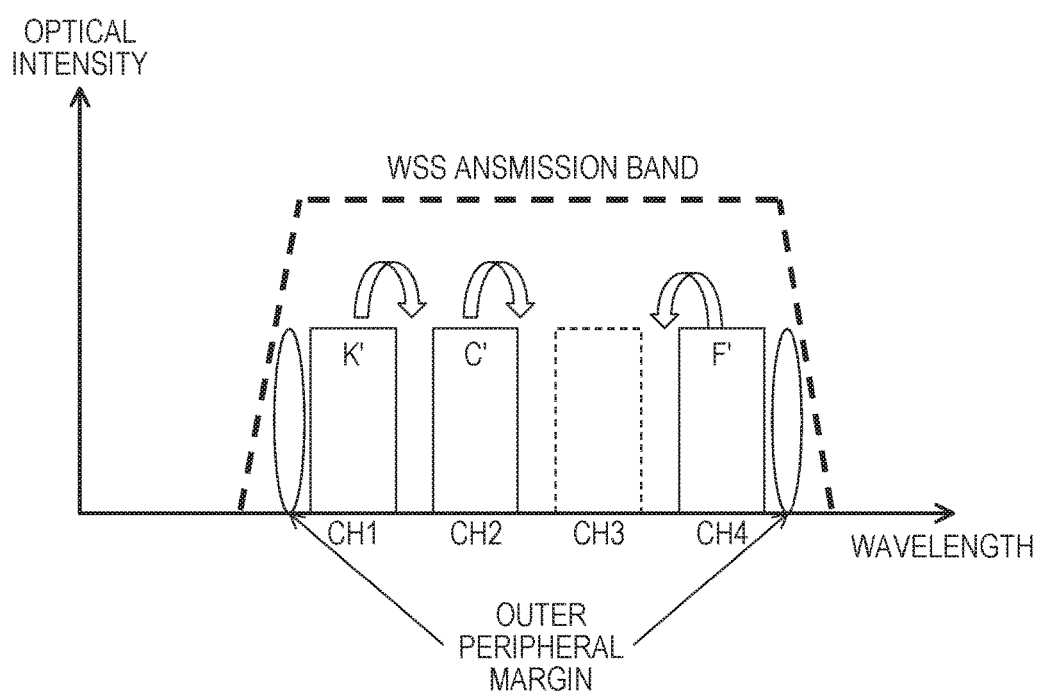
FIG. 18 is a diagram illustrating an example of a relationship between the channel and the WSS transmission band to explain an operation example according to Modified Example 1 of the embodiment.

For example, as illustrated in FIG. 17, the one-shot wavelength controlling section 703 may include a one-shot wavelength control target changing section 731. The one-shot wavelength control target changing section 731 may determine, for example, as schematically illustrated in FIG. 18, in addition to the outer edge channel CH4 on the long wavelength side, the outer edge channel CH1 on the short wavelength side and the channel CH2 adjacent to the outer edge channel CH1 as the one-shot wavelength control target.

The outer edge channel CH1 is an example of a third wavelength closest to another outer edge of the WSS transmission band on the opposite side of the wavelength range from the outer edge channel CH4 which is an example of a first wavelength, and the channel CH2 adjacent to the outer edge channel CH1 is an example of a fourth wavelength.

In this case, the one-shot wavelength controlling section 703 may shift the wavelength of each of the channels CH1 and CH2 by the set wavelength shift amount in the direction toward the channel CH3 (long wavelength side) which becomes a vacant wavelength along with the wavelength shift of the outer edge channel CH4 toward the short wavelength side.

For example, the one-shot wavelength controlling section 703 may perform the wavelength shift control on the transmission LD of each of the transmitters A and B corresponding to the channels CH1 and CH2 toward the long wavelength side by the set wavelength shift amount.

After the wavelength shift control, the channel spacing constant control may be performed on the channels CH1 and CH2 to maintain a constant spacing between the channels CH1 and CH2. For example, the reference wavelength determining and normal wavelength controlling section 704 may determine the outer edge channel CH1 of the shortest wavelength as the reference channel, and control the transmission LD of the transmitter B corresponding to the channel CH2 such that the adjacent channel CH2 maintains a constant spacing from the reference channel CH1.

According to Modified Example 1, it is possible to ensure an appropriate outer peripheral margin for both the long wavelength side and the short wavelength side of the WSS transmission band.

In FIG. 18, "K'" indicates that the reference channel K of the channel spacing constant control is determined as the one-shot wavelength control target. Further, "C'" indicates that the channel on which the channel spacing constant control is performed based on the reference channel K is determined as the one-shot wavelength control target.

In addition, although Modified Example 1 is an example in which two channels are integrated and selected as the one-shot wavelength control target, three or more channels may be integrated and selected as the one-shot wavelength control target.

MODIFIED EXAMPLE 2

Figure 19:
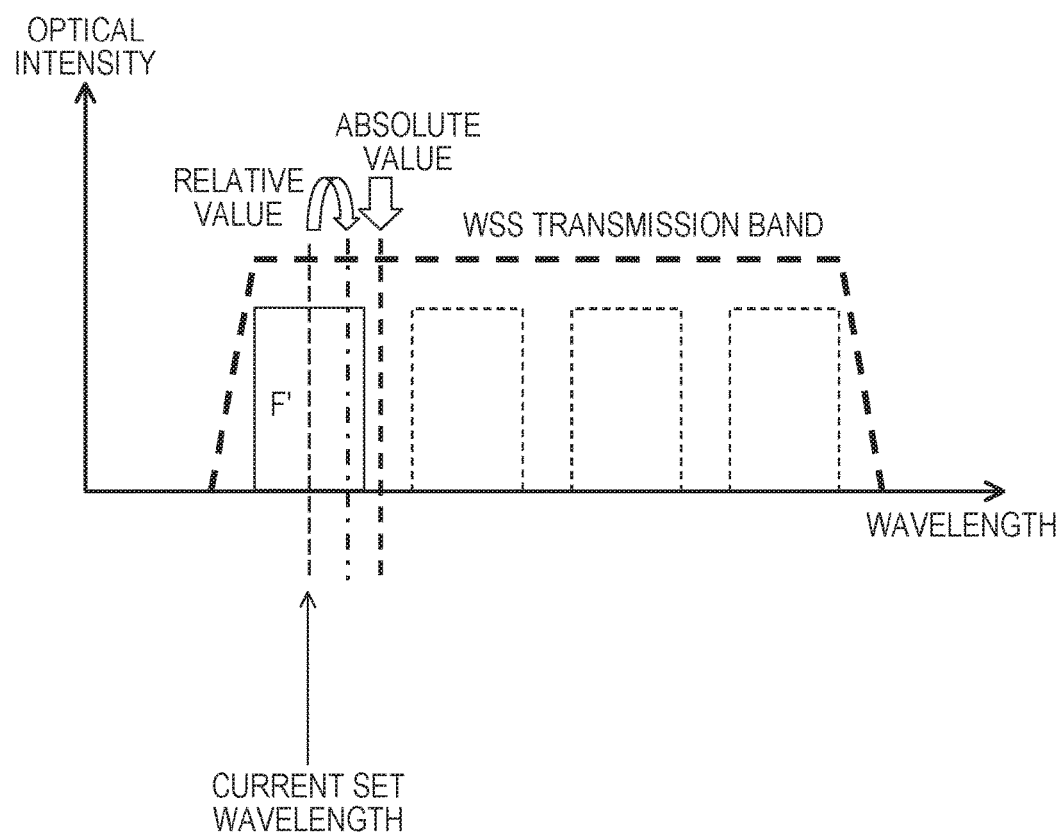
FIG. 19 is a diagram illustrating an example of a relationship between the channel and the WSS transmission band to explain an operation example according to Modified Example 2 of the embodiment.

The wavelength shift amount in the above-described one-shot wavelength control may be set as an absolute value, for example, as illustrated in FIG. 19, and may be set as a relative value from the current set wavelength of the channel of the one-shot wavelength control target.

Figure 20:
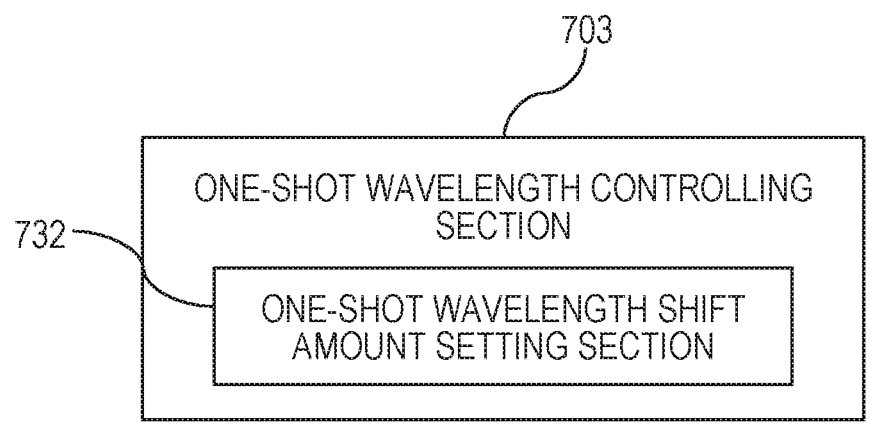
FIG. 20 is a block diagram illustrating a configuration example of a one-shot wavelength controlling section according to Modified Example 2.

Setting the wavelength shift amount as an absolute value or relative value may be performed by a one-shot wavelength shift amount setting section 732 provided in the one-shot wavelength controlling section 703, for example, as illustrated in FIG. 20. The one-shot wavelength shift amount setting section 732 may be provided in the one-shot wavelength controlling section 703 instead of or in addition to the one-shot wavelength control target changing section 731 illustrated in FIG. 17.

The absolute value of the wavelength shift amount may be a design value which has been designed in advance in anticipation of the outer peripheral margin. In the case of using the absolute value, the current set wavelength of the channel of the one-shot wavelength control target may be neglected.

By using the absolute value of the wavelength shift amount, it is possible to simplify the one-shot wavelength control. By using the relative value of the wavelength shift amount, it is possible to reduce a variable width of the wavelength shift amount, thereby facilitating the control of the transmission LD. The absolute value and the relative value of the wavelength shift amount may be set selectively.

The wavelength shift amount may not be a set value having an absolute value or relative value. For example, while monitoring the current outer peripheral margin of the outer edge channel, the one-shot wavelength control may be performed continuously until it is determined that a sufficient outer margin can be secured.

The "current outer peripheral margin" may be detected, for example, by the outer edge wavelength and vacant wavelength identifying section 701 based on the monitoring result of the channel spacing and the WSS transmission band information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
    a plurality of optical transmitters configured to transmit optical signals having variable wavelengths, respectively;
    a multiplexer configured to wavelength-multiplex the optical signals transmitted from the plurality of optical transmitters in a transmission band of an optical device through which the optical signals is transmitted; and
    a controller configured to control, in response to nonexistence of an optical signal having a second wavelength adjacent to a first wavelength closest to an outer edge of the transmission band in the optical signals, an optical transmitter corresponding to the first wavelength so as to shift the first wavelength in a direction toward the second wavelength.

2. The optical transmission apparatus according to claim 1,
    wherein, in response to the nonexistence of the optical signal having the second wavelength, the controller controls the optical transmitter corresponding to a third wavelength closest to another outer edge of the transmission band so as to shift the third wavelength in a direction toward the second wavelength, the third wavelength being located on an opposite side to the first wavelength for the second wavelength.

3. The optical transmission apparatus according to claim 2,
    wherein the controller controls the optical transmitters corresponding to the third wavelength and a fourth wavelength adjacent to the third wavelength so as to shift the third wavelength and the fourth wavelength in the direction toward the second wavelength.

4. The optical transmission apparatus according to claim 1,
    wherein the controller controls the optical transmitter so as to shift a wavelength by a predetermined frequency.

5. The optical transmission apparatus according to claim 4, wherein the predetermined frequency is set as either an absolute value corresponding to a predetermined wavelength or a relative value from a wavelength to be shifted.

6. The optical transmission apparatus according to claim 3,
wherein the controller controls, after the third wavelength and the fourth wavelength are shifted, the optical transmitter corresponding to the fourth wavelength so as to maintain a spacing between the third wavelength and the fourth wavelength to be constant.

7. The optical transmission apparatus according to claim 1,
wherein the optical device is a wavelength selective switch.

8. A wavelength control method for wavelength-multiplexing optical signals having variable wavelengths, respectively, in a transmission band of an optical device through which the optical signals are transmitted, the wavelength control method comprising:
controlling, in response to nonexistence of an optical signal having a second wavelength adjacent to a first wavelength which is closest to an outer edge of the transmission band in the optical signals, an optical transmitter corresponding to the first wavelength so as to shift the first wavelength in a direction toward the second wavelength.

\* \* \* \* \*